United States Patent [19]
Sirkar

[11] Patent Number: 5,928,409
[45] Date of Patent: Jul. 27, 1999

[54] METHOD AND APPARATUS FOR GAS REMOVAL BY CYCLIC FLOW SWING MEMBRANE PERMEATION

[75] Inventor: Kamalesh K. Sirkar, Berkeley Heights, N.J.

[73] Assignee: New Jersey Institute of Technology, Newark, N.J.

[21] Appl. No.: 08/968,705

[22] Filed: Nov. 12, 1997

[51] Int. Cl.[6] .................................. B01D 53/22
[52] U.S. Cl. .............. 95/45; 95/50; 96/4; 96/8; 96/13
[58] Field of Search ............ 95/44, 45, 47–55; 96/4, 5, 7–14

[56] References Cited

U.S. PATENT DOCUMENTS

| | | | |
|---|---|---|---|
| 4,553,983 | 11/1985 | Baker | 95/50 |
| 4,718,921 | 1/1988 | Makino et al. | 95/52 |
| 4,750,918 | 6/1988 | Sirkar | 95/44 |
| 4,770,675 | 9/1988 | Kurzweg et al. | 96/4 X |
| 4,900,448 | 2/1990 | Boone et al. | 95/44 |
| 4,955,998 | 9/1990 | Ueda et al. | 55/16 |
| 5,030,251 | 7/1991 | Rice et al. | 55/16 |
| 5,084,073 | 1/1992 | Prasad | 95/52 |
| 5,104,425 | 4/1992 | Rao et al. | 95/50 X |
| 5,108,464 | 4/1992 | Friesen et al. | 95/52 |
| 5,125,937 | 6/1992 | Sadkowski et al. | 96/8 |
| 5,131,929 | 7/1992 | Brockman et al. | 55/16 |
| 5,190,667 | 3/1993 | Jaeger | 95/45 X |
| 5,226,932 | 7/1993 | Prasad | 95/45 |
| 5,240,612 | 8/1993 | Grangeon et al. | 210/636 |
| 5,259,869 | 11/1993 | Auvil et al. | 95/52 |
| 5,281,254 | 1/1994 | Birbara et al. | 95/44 |
| 5,284,506 | 2/1994 | Barbe | 95/23 |
| 5,332,424 | 7/1994 | Rao et al. | 95/50 X |
| 5,354,474 | 10/1994 | LaPack et al. | 210/637 |
| 5,383,956 | 1/1995 | Prasad et al. | 95/45 |
| 5,487,774 | 1/1996 | Peterson et al. | 95/45 |
| 5,498,339 | 3/1996 | Creusen et al. | 95/50 X |
| 5,580,452 | 12/1996 | Lin | 96/5 X |
| 5,749,941 | 5/1998 | Jansen et al. | 95/49 X |
| 5,753,009 | 5/1998 | Sirkar et al. | 95/45 |

FOREIGN PATENT DOCUMENTS

| | | |
|---|---|---|
| 305120 | 3/1989 | European Pat. Off. . |
| 438722 | 7/1991 | European Pat. Off. . |

OTHER PUBLICATIONS

Beaver et al (1988) AIChE Symp Ser 84:113–23.
Bhaumik et al (1996) AIChEJ 42:409.
Gilleskie et al (1995) AIChEJ 41:1413.
Papadopoulos et al (1994) J Membrane Sci 94:163.
Paul et al (1971) Proc Des Dev 10:375.
Poddar et al (1996) AIChEJ 42:3267.
Poddar et al (1996) J Membrane Sci 120:221.
Yang (1987) In: Gas Separation by Adsorption Processes, Butterworths, boston, p. 1.

*Primary Examiner*—Robert Spitzer
*Attorney, Agent, or Firm*—Klauber & Jackson

[57] ABSTRACT

In one aspect, a method for selectively removing at least one target component from a multicomponent feed fluid using a removal system, the system including a feed chamber having an inlet and an outlet, a permeate chamber, and a membrane for separating the feed and permeate chambers. The membrane is selective for the at least one target component. The method includes: in a first period, introducing the feed fluid into the feed chamber through the inlet, thereby exposing the feed fluid to the membrane, while allowing flow out of the outlet, wherein at least a portion of the at least one target component in the feed chamber is removed, either by absorption or adsorption, by the membrane; in a second period, simultaneously halting flow through the inlet and the outlet of the feed chamber, thereby trapping the feed fluid within the feed chamber; and providing a component-gradient across the membrane in both the first and second periods, thereby continually removing the at least one target component and regenerating the membrane.

47 Claims, 5 Drawing Sheets

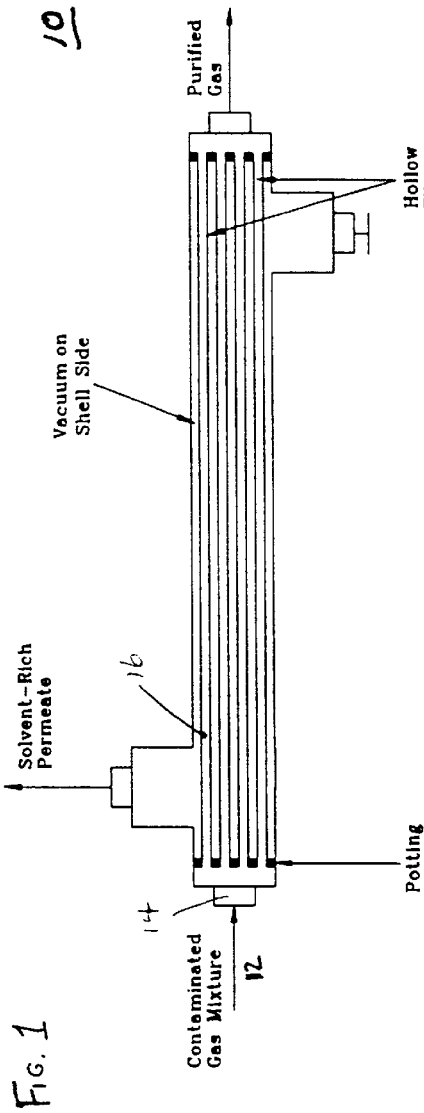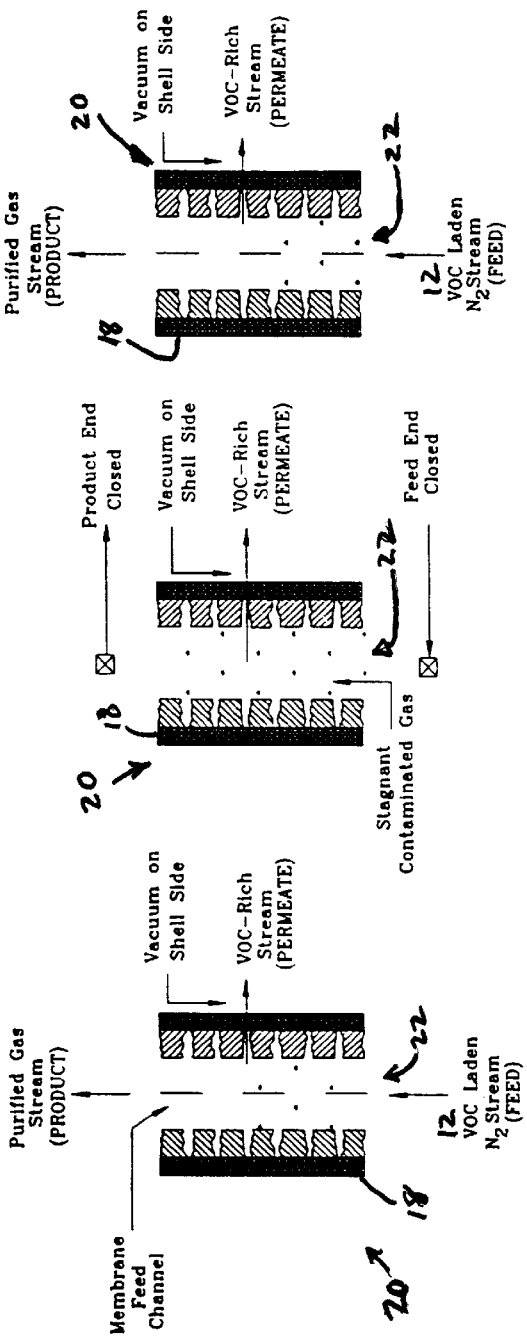

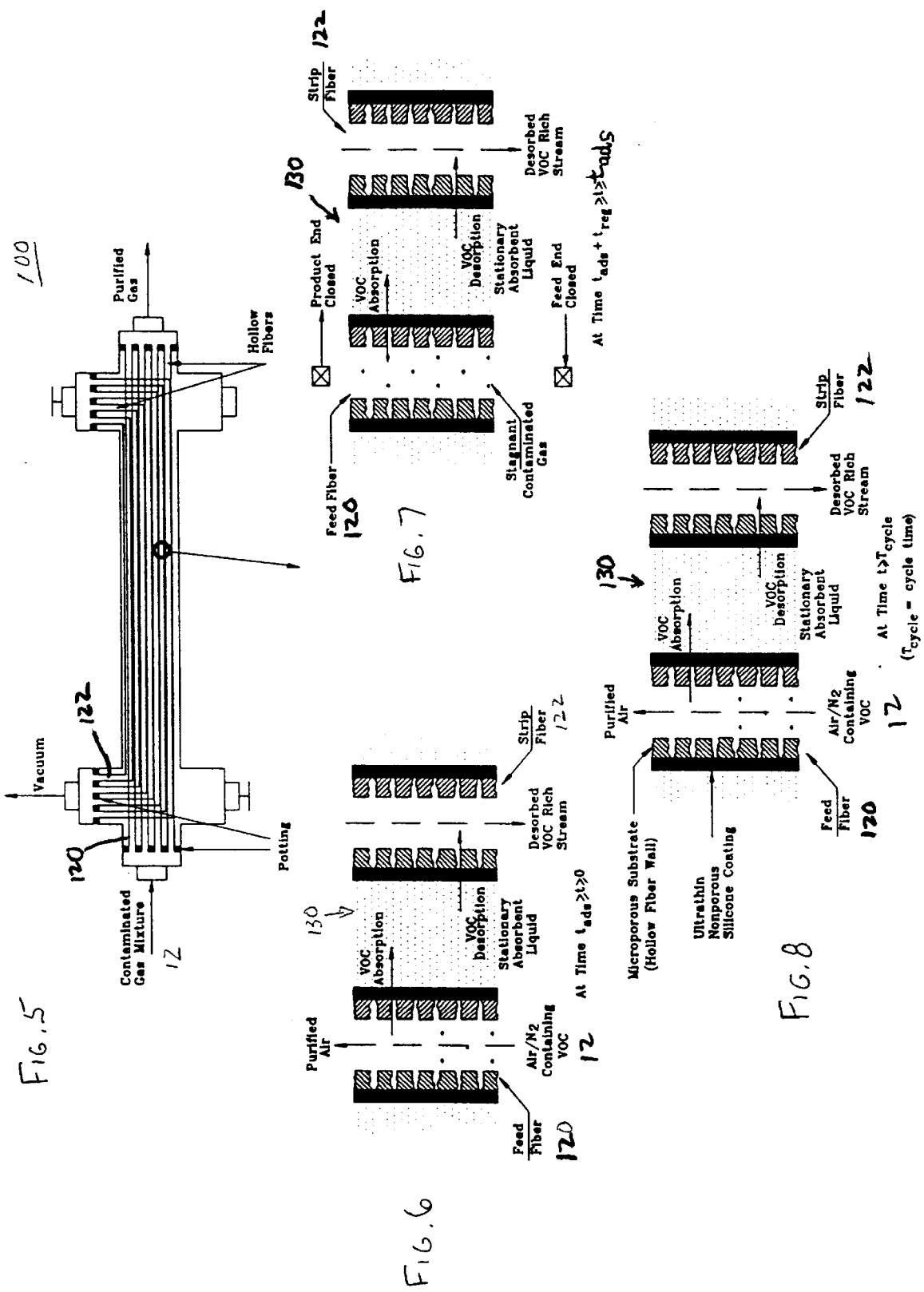

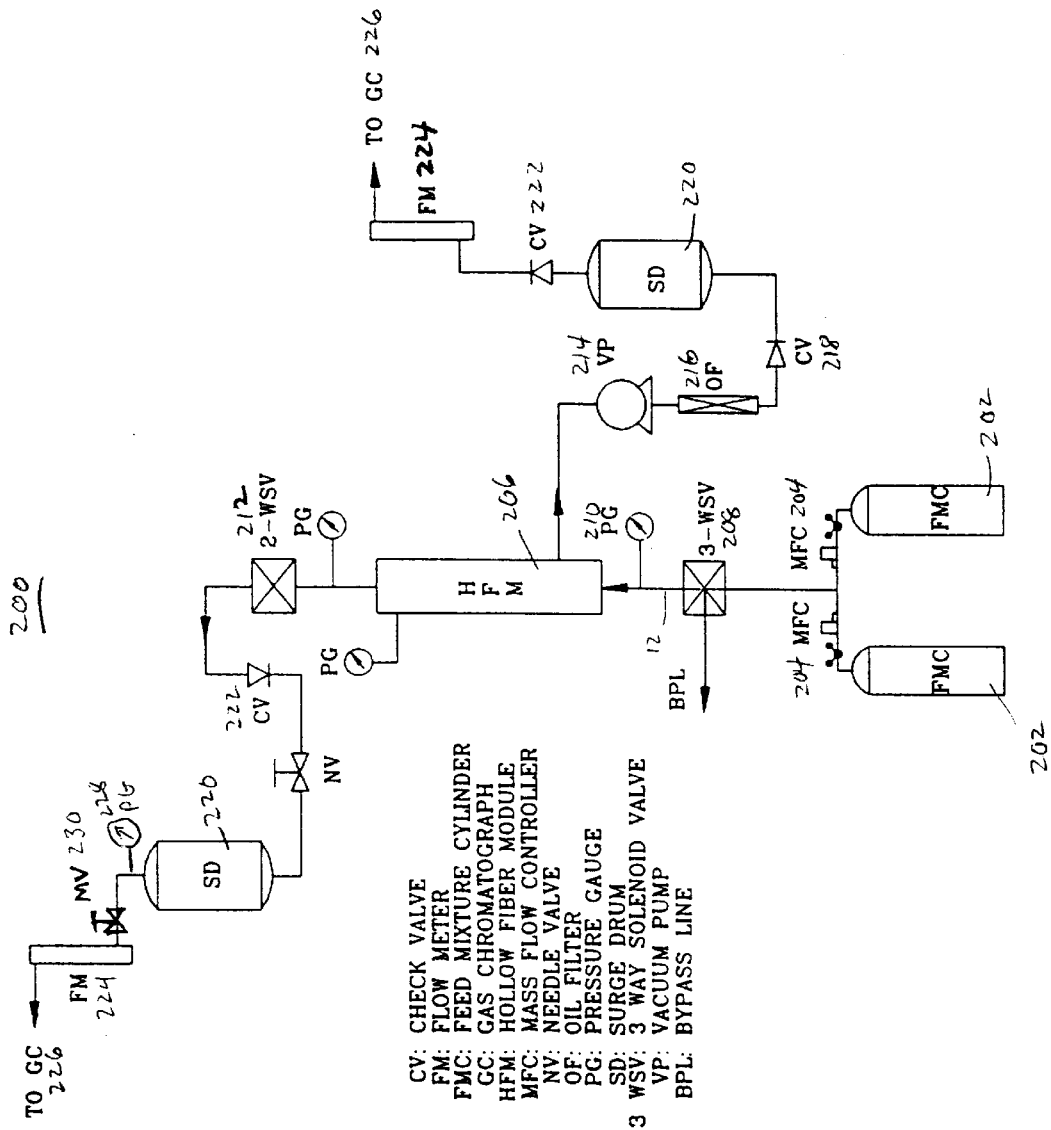

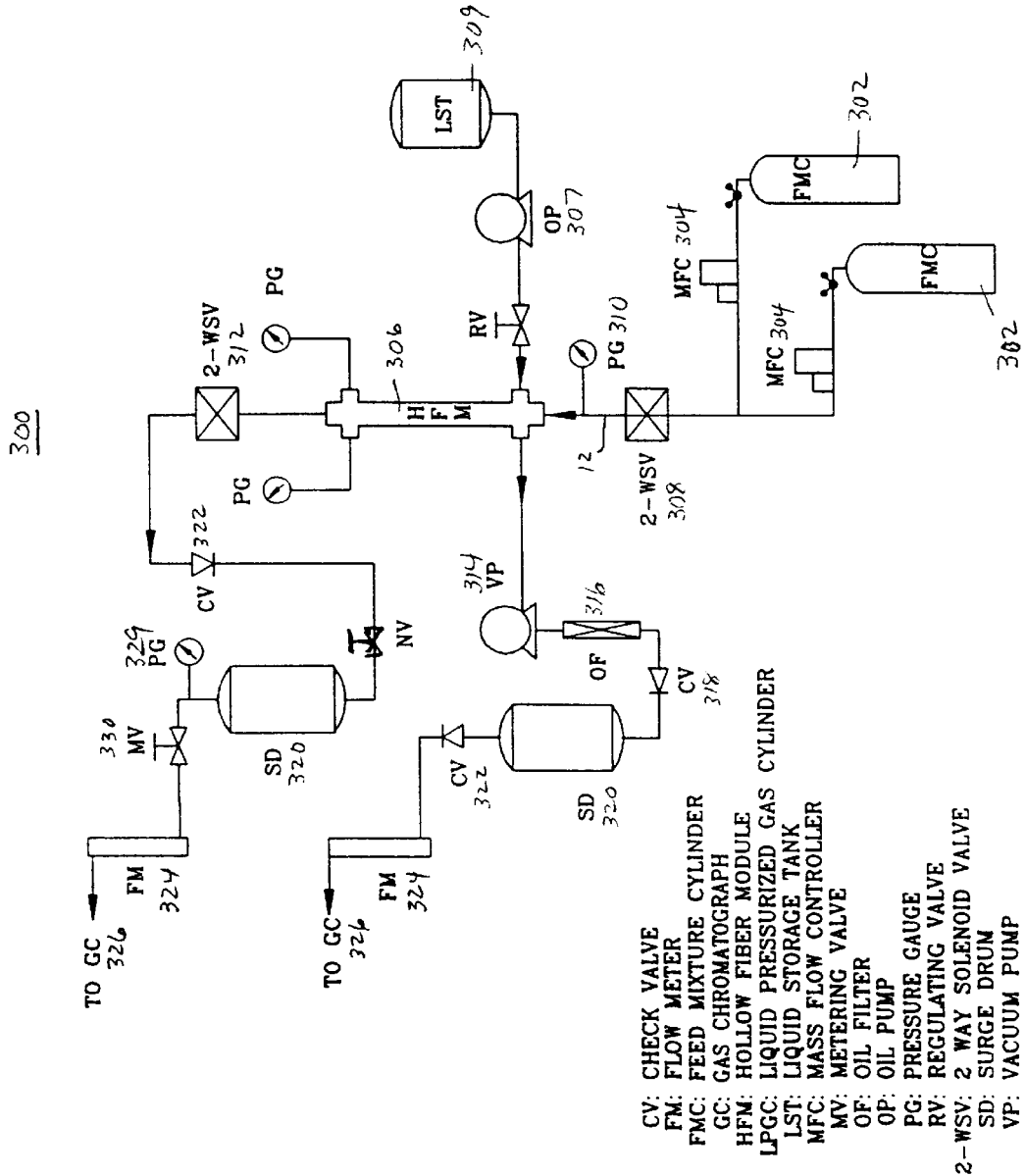

Methanol Concentration in the Treated $N_2$ Stream over an Extended Period of Time

METHOD AND APPARATUS FOR GAS REMOVAL BY CYCLIC FLOW SWING MEMBRANE PERMEATION

FIELD OF THE INVENTION

The present invention relates to selectively removing a target component, such as a gas or vapor component, from a multicomponent gas/vapor mixture by cyclic flow swing membrane permeation, and, more particularly, but not by way of limitation, to the removal of volatile organic compounds from air, nitrogen, or other gases and gas mixtures.

BACKGROUND OF THE INVENTION

The separation and removal of one gas from a mixture of gases is an important process with many applications. One particular area of concern is the removal of condensible volatile organic compounds (VOCs) from air streams, nitrogen streams and other gas streams in industrial and commercial processes and facilities. For example, VOCs used as carrier liquids and dissolving agents in many industrial processes are vaporized and escape routinely into the atmosphere via process exhaust air streams. The VOCs in such air streams are a serious environmental problem. If the air, $N_2$, or gas stream is to be safely released, the VOCs must first be removed from such discharges to control environmental pollution. VOCs are precursors to ground level ozone, a major component in the formation of smog. Another example is the removal of $CO_2$ from air, $N_2$, methane, or other gases or gas mixtures. A third example deals with the removal of olefin from paraffin. A fourth example is concerned with removal of $O_2$ from $N_2$. A fifth example considers removal of $H_2O$ from a gas stream.

High purification of a gas mixture is generally achieved in industry by means of pressure swing adsorption (PSA) processes. For example, see *Gas Separation by Adsorption Processes*, Yang, R. T., Butterworths, Boston, 1987. Typically, a gas mixture flows along a bed of adsorbents for a short period of time; the front end of the gas mixture is highly purified and is taken out as the product. After the short period, the flow of the fresh gaseous feed into the bed is stopped to prevent a breakthrough of the feed gas through the product end. The exhausted bed is either evacuated and/or cleaned by a purge gas to regenerate the bed of adsorbents for another cycle of adsorption-based purification of the feed gas mixture. The multi-step process of bed regeneration is generally complex, and PSA beds are bulky.

It would be useful if a membrane device could be economically used to purify the feed gas mixture to the same extent, as membrane devices are compact and modular, and capital costs associated with membranes are generally lower than other devices and processes. However, membrane separation processes which are operated in a conventionally steady-state fashion are known to be efficient only for bulk gas separation. See Integration of Membranes with Other Air Separation Technologies, Beaver, E. R., Bhat P. V., Sarcia D. S., *AIChE Symp.Ser.*, 1988, No.261, vol. 84, 118.

Existing cyclically-operated membrane-based separation processes may be classified as being of two types: high/low pressure swing and adsorbent particle-based/absorbent liquid-based processes.

In the first type of process, polymeric gas separation membrane-based devices are operated with a cyclic pulsing of the gas pressure on the upstream side of the membrane between a high value of P, the feed gas pressure, and p, the permeate side pressure (<P). The permeate side pressure p is always maintained at a low value. For example, see Membrane Separation of Gases Using Steady Cyclic Operation, Paul, D. R., *I&E.C. Proc.Des.Dev.*, 1971, 10, 375. For a gas mixture, such an operation allows an improved selectivity between a rapidly-diffusing "species 1" and a slower-diffusing "species 2". The first fraction of the permeate collected is more enriched in species 1 than is possible in steady-state processes.

A recent minor variation of such a process introduces an inert purge gas or an inert liquid into the feed gas side during the interval when the high pressure feed gas flow on the feed side is stopped. See U.S. Pat. No. 5,354,474 issued to LaPack et al. on Oct. 11, 1994.

Another variation of the process of Paul referenced hereinabove was suggested by Lapack and Dupuis in U.S. Pat. No. 5,354,474 which involves collecting a second permeate fraction more enriched in species 2 during a brief period after the first period used to collect a permeate fraction enriched in species 1.

Yet another variation of this first type of process is suggested by Ueda et al. in U.S. Pat. No. 4,955,998 issued on Sep. 11, 1990 involving the implementation of alternate introduction of feed gas under pressure to the feed side and evacuation of the permeating gas under vacuum to maximize the driving pressure difference between the feed and the permeate side.

It should be noted that steady-state processes often have special provisions for start-up time-dependency. For example, in air dehydration processes by a membrane unit, at steady-state, the membrane unit delivers adequately dehumidified air. However, during start-up with a compressor, there are problems due to low pressure and residual moisture in the permeator from an earlier period. In order to address these problems, a purge gas stream may be introduced at atmospheric pressure from the high pressure dried product gas end during the interrupted period when no high pressure feed gas is being supplied. Usually the purge gas is obtained from the purified high pressure product gas which was obtained from its earlier operation, as described, for example, in U.S. Pat. No. 5,030,251 issued on Jul. 9, 1991 to Rice and Brown. The utility of the high pressure purge stream has also been demonstrated in the production of $N_2$. In order to avoid using a purge stream in such air dehydration processes as described in U.S. Pat. No. 5,030,251, Brockman and Rice, in U.S. Pat. No. 5,131,929 issued on Jul. 21, 1992, have suggested a delay at the beginning of the process as well as additional condensation of moisture beyond the compressor prior to introduction of the high pressure feed air into the membrane dehumidifier.

In the second type of process, microporous hollow fiber membranes have been employed along with fine adsorbent particles, as described, for example, in Gas Separations in Hollow-Fiber Adsorbers, Gilleskie et al., *AIChEJ*, 1995, 41, 1413. Alternatively, an aqueous absorbent liquid that does not wet the pores of the membrane has been employed on the shell side, as described, for example, in Hollow-Fiber Membrane Based Rapid Pressure Swing Absorption, Bhaumik, S., Majumdar, S., and Sirkar, K. K., *AIChEJ*, 1996, 42, 409. Thus, the feed gas mixture flows through the bores of the hollow fine fibers. The adsorbent particle adsorbs specific species from the feed gas mixture; alternately, the aqueous absorbent liquid absorbs the selected species. The high pressure feed gas leaving the exit end of the feed fibers is highly purified, and the feed gas flow is stopped after sometime to prevent a breakthrough of the species at the exit end. The bed of adsorbents or the shell-side liquid absorbent is then regenerated by a variety of demanding multistep procedures borrowed from PSA processes. While such processes are inherently capable of producing a highly purified gas stream from the incoming high pressure feed gas, the bed regeneration process leaves much to be desired especially when rapid cyclic processes are implemented for high levels of feed gas purification. The membrane in such a process does not perform any chemical separation as such.

The citation of any reference herein should not be construed as an admission that such reference is available as prior art to the invention.

SUMMARY OF THE INVENTION

In one aspect, the present invention comprises an apparatus for selectively removing at least one target component from a multicomponent feed fluid. The apparatus can remove more than one target component simultaneously.

In a preferred embodiment, the apparatus comprises: a housing provided with a feed chamber; feed inlet means for allowing the feed fluid to flow into the feed chamber; feed outlet means for allowing the feed fluid to flow out of the feed chamber; membrane means disposed in the housing for selectively allowing the permeation of the at least one target component therethrough, and having a feed side for contacting the feed fluid and a permeate side for delivering the at least one target component, wherein the feed side defines at least part of the feed chamber; permeate means for drawing the at least one target component from the permeate side of the membrane means, thereby providing a component-gradient across the membrane means; and control means for controlling the flow of the feed fluid through the feed inlet means and the feed outlet means, wherein the feed fluid, at a desired feed fluid pressure, is cyclically introduced into the feed chamber into contact with the membrane means. Thus, the at least one target component is removed from the feed fluid, and the feed fluid exiting through the feed outlet means is at least partially purified of the at least one target component.

Further preferably, the permeate means continuously removes the at least one target component from the permeate side, whereby the membrane means is continuously regenerated.

In one embodiment, at least one cycle of contact between the feed fluid and the membrane means preferably comprises an adsorption period and a regeneration period. In the adsorption period, unpurified feed fluid passes through the feed inlet means, into the feed chamber, and into contact with the membrane means, wherein the at least one target component is adsorbed onto the feed side of the membrane means, and wherein the permeate means draws the at least one target component off the permeate side of the membrane means. In the regeneration period, flow of the feed fluid into the feed inlet means and out of the feed outlet means is stopped, and the permeate means draws the at least one target component off the permeate side of the membrane means, thereby regenerating the membrane means, thereby further purifying the feed fluid which is retained in the feed chamber.

The adsorption period may be terminated before a predetermined concentration of the at least one target component reaches the feed outlet means, and/or the adsorption period may be terminated after a predetermined period of time. Furthermore, the regeneration period may be terminated after a predetermined period of time.

In another embodiment, the at least one cycle of contact between the feed fluid and the membrane means preferably comprises a first period wherein unpurified feed fluid is introduced into the feed chamber and brought into contact with the membrane means, and a second period wherein the feed fluid is retained in the feed chamber and kept in contact with the membrane means while flow of the feed fluid into the feed inlet means and out of the feed inlet means is substantially halted, whereby purification of the feed fluid is maximized. The control means may regulate the respective durations of the first and second periods. In the first period, the flow of unpurified feed fluid into the feed chamber preferably induces the previously purified feed fluid disposed in the feed chamber to exit through the feed outlet means. The cycle may further comprise a third period wherein flow of the feed fluid into the feed inlet means remains halted and flow of the feed fluid out of the feed outlet means is induced.

In one embodiment, the permeate means may comprise means for maintaining the partial pressure of the at least one target component on the permeate side of the membrane means lower than the partial pressure on the feed side of the membrane means. In another embodiment, the permeate means may comprise means for maintaining the total pressure on the permeate side of the membrane means substantially lower than the total pressure on the feed side of the membrane means. In yet another embodiment, the permeate means may comprise means for sweeping the permeate side of the membrane means with a sweep fluid. In another embodiment, the permeate means may comprise means for maintaining at least a partial vacuum on the permeate side of the membrane means.

The multicomponent feed fluid may comprise at least one target component and at least one non-target component, wherein the at least one target component passes through the membrane more rapidly than the at least one non-target component.

In one preferred embodiment, the membrane means comprises a porous membrane with a nonporous selective coating.

Either a polymeric membrane or a nonpolymeric membrane may be utilized in the present invention. In one embodiment, the membrane means may comprise a ceramic membrane with a ceramic nonporous skin.

In one preferred embodiment, the membrane means comprises a plurality of porous membranes adapted to contact the feed fluid in parallel. The porous membrane may comprise at least one polymeric hollow fiber.

In one preferred embodiment, the feed fluid passes through the lumen of the hollow fiber. In another embodiment, the feed fluid passes over the exterior of the hollow fiber.

In one particularly preferred embodiment, the porous membrane comprises a thin film composite (TFC) membrane having a selective nonporous polymeric membrane coating over a microporous substrate.

The porous membrane may further comprise a liquid membrane immobilized or supported in the pores of the porous substrate.

In a particularly preferred embodiment, the membrane means comprises at least one hollow fiber module having a plurality of hollow fibers disposed within a hollow shell housing. The feed fluid preferably flows through the lumina of the fibers. The permeate means further preferably draws a vacuum on the shell side of the fibers.

In one embodiment, the plurality of hollow fibers further comprises first and second sets of hollow fibers disposed within the hollow shell housing and a liquid membrane is disposed between the first and second sets of hollow fibers in the shell side of the housing. The feed fluid flows through the lumina of the first set of hollow fibers, and the permeate means draws a vacuum on the lumina of the second set of hollow fibers.

In one particularly preferred embodiment, the hollow fiber module comprises a plurality of microporous polypropylene hollow fibers, wherein the exterior of each fiber is covered with a thin plasma polymerized nonporous silicone coating.

In another embodiment, the membrane means may further include: at least one feed membrane having a feed side for contacting the feed fluid and an intermediate membrane side, the at least one feed membrane being selective for the at least one target component; at least one permeate membrane having an intermediate membrane side and a permeate side which is exposed to the permeate means, the at least one permeate membrane being selective for the at least one target component; and an intermediate fluid disposed between the intermediate membrane sides of the feed and permeate membranes, the intermediate fluid being selective for the at least one target component. Thus, the at least one target component is capable of passing from the feed fluid, through the feed membrane, through the intermediate fluid, and through the permeate membrane. The intermediate fluid is preferably a liquid, and in one preferred embodiment, the intermediate fluid is a nonvolatile liquid absorbent.

The apparatus may further comprise a means for metering the flow of the feed fluid. The apparatus may also include a surge collection means for collecting the at least one target component drawn by the permeate means. The apparatus may also include a surge collection means for collecting the purified or treated feed stream.

In another aspect, the present invention relates to a method for selectively removing at least one target component from a multicomponent feed fluid using a removal system, the system including a feed chamber having an inlet and an outlet, a permeate chamber, and a membrane means for separating the feed and permeate chambers, wherein the membrane is selective for the at least one target component. The method comprises: in a first period, introducing the feed fluid into the feed chamber through the inlet, thereby exposing the feed fluid to the membrane, while allowing flow out of the outlet, wherein at least a portion of the at least one target component in the feed chamber is removed, e.g. absorbed and/or adsorbed, by the membrane; in a second period, simultaneously halting flow through the inlet and the outlet of the feed chamber, thereby trapping the feed fluid within the feed chamber; and providing a component-gradient across the membrane in both the first and second periods, thereby continually removing the at least one target component and regenerating the membrane. The component-gradient may be provided, for example, by maintaining a lower total pressure in the permeate chamber than the total pressure in the feed chamber, or by maintaining at least a partial vacuum in the permeate chamber, or by passing a sweep fluid through the permeate chamber past the membrane.

The first period may be terminated before a maximum threshold of the at least one target component reaches the outlet, and/or the first period may be terminated after a predetermined time period.

In one embodiment, the membrane means may comprise at least one feed membrane having a feed side for contacting the feed fluid and an intermediate membrane side, and at least one permeate membrane having an intermediate membrane side and a permeate side, wherein an intermediate fluid is maintained between the intermediate membrane sides of the feed and permeate membranes, wherein the feed membrane, the intermediate fluid, and the permeate membrane are each selective for the at least one target component. The intermediate fluid is preferably a liquid, and in a particular embodiment, may be comprised of a nonvolatile liquid absorbent.

Furthermore, the method may include collecting the at least one target component from the permeate chamber.

The at least one nonporous membrane comprises at least one nonporous rubbery skin membrane fabricated from a thermoplastic material. The nonporous rubbery skin membrane is preferably plasma polymerized onto the second side of the at least one porous membrane and more preferably is fabricated from ultrathin plasma polymerized nonporous silicone rubber.

It should be noted that many types of porous membrane may be utilized in the present invention, including both permselective and non-permselective porous membranes. That is, although some porous membranes are not permselective, a microporous membrane which is permselective may be used to support a permselective nonporous membrane in the present invention.

In another preferred embodiment, the present invention contemplates putting a nonvolatile liquid in the pores wherein the liquid is highly selective to the species to be removed.

Experimental results show that introducing feed gas into the tube side of a hollow fiber module (HFM) having an ultrathin nonporous plasma polymerized silicone coating over the outside surface of a porous substrate in a shell-and-tube arrangement is very effective in removing various VOC vapors, including toluene, methanol, methylene chloride, and acetone, from feed $N_2$ and air gas streams.

Accordingly, it is an object of the present invention to provide an improved system and process, for selective removal of a vapor or gas (or vapors or gases) from a multicomponent gas mixture.

It is another object of the present invention to provide a system and method for purifying a gas mixture to a high degree.

It is yet another object of the invention to provide a membrane device which could be used to economically purify a feed gas mixture.

It is yet another object of the invention to provide an improved gas purification process for removal of VOCs from air, nitrogen, or other gas/vapor mixtures or streams.

It is an additional object of the invention to provide such a device which is economical to construct.

It is yet another object of the invention to provide such a device which is compact.

Other objects of the present invention, as well as particular features, elements, and advantages thereof, will be elucidated in, or be apparent from, the following description and the accompanying drawing figures.

BRIEF DESCRIPTION OF THE DRAWINGS

Understanding of the present invention and the various aspects thereof will be facilitated by reference to the accompanying drawing figures, submitted for purposes of illustration only and not intended to define the scope of the invention, on which:

FIG. 1 is a schematic representation of a first preferred embodiment of the gas separation system of the present invention having a shell-and-tube configuration.

FIGS. 2–4 are cross-sectional representations of a portion of a hollow fiber of the first preferred embodiment of the present invention, for example as shown in FIG. 1, showing the nature of operation in flow swing membrane permeation, as described hereinbelow.

FIG. 2 shows unpurified feed gas being introduced into the feed end of the bore of the fiber thereby causing already purified gas to exit from the product end of the bore of the fiber corresponding to a time period where $t_{ads} \geq t \geq 0$.

FIG. 3 shows unpurified feed gas being retained in the bore of the fiber and being purified by permeation wherein both the feed and product ends of the fiber are closed corresponding to a time period where $t_{ads}+t_{reg} \geq t \geq t_{ads}$.

FIG. 4 shows the beginning of a new cycle of operation wherein the feed and product ends of the fiber are again opened corresponding to a time period where $t \geq T_{cycle} = t_{ads} + t_{reg}$, where $T_{cycle}$=cycle time.

FIG. 6 shows unpurified feed gas being introduced into the feed end of the bore of the fiber of a first set of fibers thereby causing already purified gas to exit from the product end of the bore of the fiber corresponding to a time period where $t_{ads} \geq t \geq 0$.

FIG. 7 shows unpurified feed gas being retained in the bore of the fiber of the first set of fibers wherein both the feed and product ends of the fiber are closed corresponding to a time period where $t_{ads}+t_{reg} \geq t \geq t_{ads}$.

FIG. 8 shows the beginning of a new cycle of operation wherein the feed and product ends of the fiber of the first set of fibers are again opened corresponding to a time period where $t \geq T_{cycle} = t_{ads}+t_{reg}$, where $T_{cycle}$=cycle time.

DETAILED DESCRIPTION OF THE INVENTION

Figure 11:
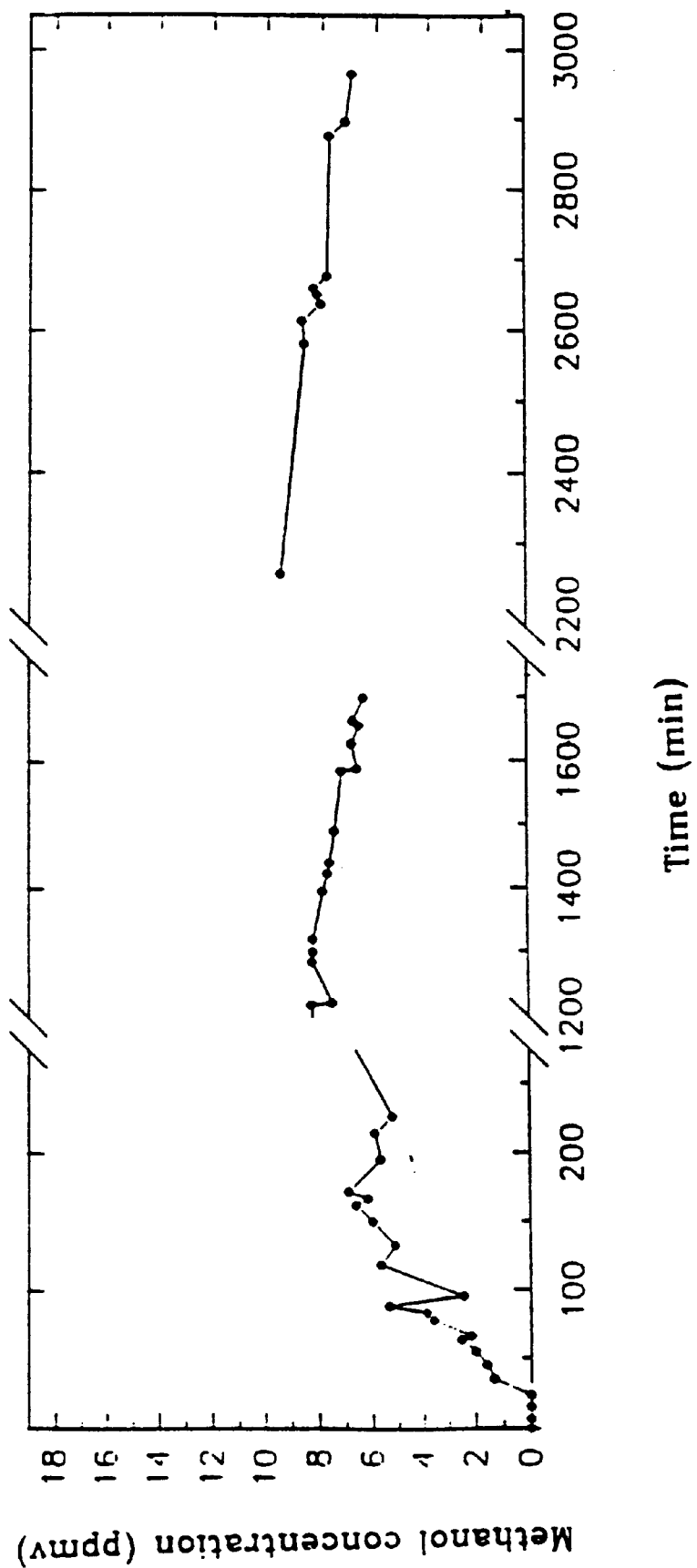
FIG. 11 is a graph showing methanol concentration in an $N_2$ stream emerging from a preferred embodiment of the present invention utilizing flow swing membrane permeation.

In one aspect, the present invention comprises an apparatus for selectively removing at least one target component from a multicomponent feed fluid. The apparatus can remove more than one target component simultaneously.

In a preferred embodiment, the apparatus comprises: a housing provided with a feed chamber; feed inlet means for allowing the feed fluid to flow into the feed chamber; feed outlet means for allowing the feed fluid to flow out of the feed chamber; membrane means disposed in the housing for selectively allowing the permeation of the at least one target component therethrough, and having a feed side for contacting the feed fluid and a permeate side for delivering the at least one target component, wherein the feed side defines at least part of the feed chamber; permeate means for drawing the at least one target component from the permeate side of the membrane means, thereby providing a component-gradient across the membrane means; and control means for controlling the flow of the feed fluid through the feed inlet means and the feed outlet means, wherein the feed fluid, at a desired feed fluid pressure, is cyclically introduced into the feed chamber into contact with the membrane means. Thus, the at least one target component is removed from the feed fluid, and the feed fluid exiting through the feed outlet means is at least partially purified of the at least one target component.

Further preferably, the permeate means continuously removes the at least one target component from the permeate side, whereby the membrane means is continuously regenerated.

In one embodiment, at least one cycle of contact between the feed fluid and the membrane means preferably comprises an adsorption period and a regeneration period. In the adsorption period, unpurified feed fluid passes through the feed inlet means, into the feed chamber, and into contact with the membrane means, wherein the at least one target component is adsorbed onto the feed side of the membrane means, and wherein the permeate means draws the at least one target component off the permeate side of the membrane means. In the regeneration period, flow of the feed fluid into the feed inlet means and out of the feed outlet means is stopped, and the permeate means draws the at least one target component off the permeate side of the membrane means, thereby regenerating the membrane means, thereby further purifying the feed fluid which is retained in the feed chamber.

The adsorption period may be terminated before a predetermined concentration of the at least one target component reaches the feed outlet means, and/or the adsorption period may be terminated after a predetermined period of time. Furthermore, the regeneration period may be terminated after a predetermined period of time.

In another embodiment, the at least one cycle of contact between the feed fluid and the membrane means preferably comprises a first period wherein unpurified feed fluid is introduced into the feed chamber and brought into contact with the membrane means, and a second period wherein the feed fluid is retained in the feed chamber and kept in contact with the membrane means while flow of the feed fluid into the feed inlet means and out of the feed inlet means is substantially halted, whereby purification of the feed fluid is maximized. The control means may regulate the respective durations of the first and second periods. In the first period, the flow of unpurified feed fluid into the feed chamber preferably induces the previously purified feed fluid disposed in the feed chamber to exit through the feed outlet means. The cycle may further comprise a third period wherein flow of the feed fluid into the feed inlet means remains halted and flow of the feed fluid out of the feed outlet means is induced.

In one embodiment, the permeate means may comprise means for maintaining the partial pressure of the at least one target component on the permeate side of the membrane means lower than the partial pressure on the feed side of the membrane means. In another embodiment, the permeate means may comprise means for maintaining the total pressure on the permeate side of the membrane means substantially lower than the total pressure on the feed side of the membrane means. In yet another embodiment, the permeate means may comprise means for sweeping the permeate side of the membrane means with a sweep fluid. In another embodiment, the permeate means may comprise means for maintaining at least a partial vacuum on the permeate side of the membrane means.

The multicomponent feed fluid may comprise at least one target component and at least one non-target component, wherein the at least one target component passes through the membrane more rapidly than the at least one non-target component.

In one preferred embodiment, the membrane means comprises a porous membrane with a nonporous selective coating.

Either a polymeric membrane or a nonpolymeric membrane may be utilized in the present invention. In one embodiment, the membrane means may comprise a ceramic membrane with a ceramic nonporous skin.

In one preferred embodiment, the membrane means comprises a plurality of porous membranes adapted to contact the feed fluid in parallel. The porous membrane may comprise at least one polymeric hollow fiber.

In one preferred embodiment, the feed fluid passes through the lumen of the hollow fiber. In another embodiment, the feed fluid passes over the exterior of the hollow fiber.

In one particularly preferred embodiment, the porous membrane comprises a thin film composite (TFC) membrane having a selective nonporous polymeric membrane coating over a microporous substrate.

The porous membrane may further comprise a liquid membrane immobilized or supported in the pores of the porous substrate.

In a particularly preferred embodiment, the membrane means comprises at least one hollow fiber module having a plurality of hollow fibers disposed within a hollow shell housing. The feed fluid preferably flows through the lumina of the fibers. The permeate means further preferably draws a vacuum on the shell side of the fibers.

In one embodiment, the plurality of hollow fibers further comprises first and second sets of hollow fibers disposed within the hollow shell housing and a liquid membrane is disposed between the first and second sets of hollow fibers in the shell side of the housing. The feed fluid flows through the lumina of the first set of hollow fibers, and the permeate means draws a vacuum on the lumina of the second set of hollow fibers.

In one particularly preferred embodiment, the hollow fiber module comprises a plurality of microporous polypropylene hollow fibers, wherein the exterior of each fiber is covered with a thin plasma polymerized nonporous silicone coating.

In another embodiment, the membrane means may further include: at least one feed membrane having a feed side for contacting the feed fluid and an intermediate membrane side, the at least one feed membrane being selective for the at least one target component; at least one permeate membrane having an intermediate membrane side and a permeate side which is exposed to the permeate means, the at least one permeate membrane being selective for the at least one target component; and an intermediate fluid disposed between the intermediate membrane sides of the feed and permeate membranes, the intermediate fluid being selective for the at least one target component. Thus, the at least one target component is capable of passing from the feed fluid, through the feed membrane, through the intermediate fluid, and through the permeate membrane. The intermediate fluid is preferably a liquid, and in one preferred embodiment, the intermediate fluid is a nonvolatile liquid absorbent.

The apparatus may further comprise a means for metering the flow of the feed fluid. The apparatus may also include a surge collection means for collecting the at least one target component drawn by the permeate means. The apparatus may also include a surge collection means for treated fluid collection.

In another aspect, the present invention relates to a method for selectively removing at least one target component from a multicomponent feed fluid using a removal system, the system including a feed chamber having an inlet and an outlet, a permeate chamber, and a membrane means for separating the feed and permeate chambers, wherein the membrane is selective for the at least one target component. The method comprises: in a first period, introducing the feed fluid into the feed chamber through the inlet, thereby exposing the feed fluid to the membrane, while allowing flow out of the outlet, wherein at least a portion of the at least one target component in the feed chamber is removed, e.g. absorbed and/or adsorbed, by the membrane; in a second period, simultaneously halting flow through the inlet and the outlet of the feed chamber, thereby trapping the feed fluid within the feed chamber; and providing a component-gradient across the membrane in both the first and second periods, thereby continually removing the at least one target component and regenerating the membrane. The component-gradient may be provided, for example, by maintaining a lower total pressure in the permeate chamber than the total pressure in the feed chamber, or by maintaining at least a partial vacuum in the permeate chamber, or by passing a sweep fluid through the permeate chamber past the membrane.

The first period may be terminated before a maximum threshold of the at least one target component reaches the outlet, and/or the first period may be terminated after a predetermined time period.

In one embodiment, the membrane means may comprise at least one feed membrane having a feed side for contacting the feed fluid and an intermediate membrane side, and at least one permeate membrane having an intermediate membrane side and a permeate side, wherein an intermediate fluid is maintained between the intermediate membrane sides of the feed and permeate membranes, wherein the feed membrane, the intermediate fluid, and the permeate membrane are each selective for the at least one target component. The intermediate fluid is preferably a liquid, and in a particular embodiment, may be comprised of a nonvolatile liquid absorbent.

Furthermore, the method may include collecting at least one target component from the permeate chamber.

As used herein, the term "target component" may be a gas/vapor component which refers to a compound, such as a VOC, which can be found in a gaseous state mixture with a carrier gas, such as $N_2$, air, argon, carbon dioxide, methane, etc. Preferably the gas/vapor component is a vapor, i.e., in the gaseous state below the gas-liquid critical point. Vapors are more readily adsorbed and condensed on an adsorbent-saturated surface, such as an asymmetric nano-sized pore (6–50 Å) and nonporous membrane interface in a composite membrane of the invention.

The term "porous membrane" or "microporous membrane" refers to a hydrophobic or a hydrophilic, or hydrophobic on one side and hydrophilic on the other side material containing pores having a diameter between 0.8 nm to about 10 μm. Preferably, the membrane is provided in the form of a hollow fiber or a fine tubule.

The term "ultrathin" when referring to the thickness of a highly solute-permeable plasma polymerized nonporous silicone skin on the outside surface of the porous membrane means approximately 0.1 μm to 10 μm; preferably about 1 μm. This ultrathin nonporous skin is a significant barrier to permeation for such gases as air, nitrogen, carbon dioxide, etc. The skin developed by plasma polymerization on the microporous substrate develops an integral bonding with the substrate. Examples of ultrathin nonporous skin include rubber-like materials such as dimethylsilicone, copolymers of silicone-polycarbonate, poly (1-trimethyl silyl- 1 -propyne), fluoroelastomers, polyurethane, and polyvinylchloride, to mention a few. A skin developed by glassy polymeric materials may also be useful for particular separations.

The term "hydrophobic" describes a substance which does not absorb or adsorb water. Preferred hydrophobic membranes include porous polyethylene, porous polypropylene, porous polyamides, porous polyimides, porous polyetherketones, porous polyvinylidene fluoride, porous polyvinylchloride, porous polysulfone, porous polyethersulfone, and porous polytetrafluoroethylene (PTFE). Microporous carbon could also be utilized. In a specific embodiment, the hydrophobic membrane is a porous propylene membrane, CELGARD (Hoechst Celanese, SPD, Charlotte, N.C.). These membranes may be isotropic (like CELGARD), or they may be asymmetric, as in ultrafiltration membranes. In an embodiment of the invention, the hydrophobic membranes may be CELGARD X-10, CELGARD X-20, and CELGARD X-30. Those skilled in the art will recognize that the above list of examples is not exhaustive.

The term "hydrophilic" describes a substance that readily associates with water. Preferred hydrophilic membranes include porous regenerated cellulose, porous cellulose acetate, porous cellulose acetate-nitrate, porous cellulose triacetate, microporous glass, microporous aluminum, porous porcelain, and polyacrylonitrile, to mention a few. Those skilled in the art will recognize that the above list of examples is not exhaustive.

Specific examples of volatile organic compounds include toluene, xylene, acetone, trichloroethylene, trichloroethane, methanol, ethanol, methyl ethyl ketone, carbon tetrachloride, vinyl chloride, isobutanol, chlorobenzene, butane, pentane, hexane, octane, fluorinated hydrocarbons (CFC-11, CFC-12, CFC-113, CFC-114, CFC-115, etc.), HCFC ($C_2HCl_2F_3$), perchloroethylene, to mention but a few. Those skilled in the art will recognize the above list of examples is not exhaustive.

Experiments with preferred embodiments of the present invention as described below have clearly shown that, when separating VOCs from air/$N_2$, $N_2$/air of extremely high purity is produced. Further, if the membrane is highly selective for VOC's, the permeate stream is very highly enriched in the VOC.

Thus, the present invention provides a rapid and simple cyclic process for the separation of a gas mixture, for example, a binary gas mixture, and in one aspect, the separation is achieved by a contained liquid membrane. Thus, one aspect of the present invention may be referred to as Flow Swing Membrane Permeation (FSMP) and another aspect of the present invention which utilizes a contained liquid membrane may be characterized as "Flow Swing Membrane Absorption-Permeation" (FSMABP) or "Flow Swing Liquid Membrane Permeation" (FSLMP).

By way of example, and not by limitation, particular embodiments are hereinafter discussed which in the context of separating volatile organic compounds (VOCs) from nitrogen at essentially atmospheric pressure in a Hollow Fiber Module. For the particular system(s) of VOC-$N_2$ separation chosen for illustration and discussion, the present invention provides two almost pure, or at least very pure, streams, i.e. a product $N_2$ stream containing very little VOCs and a permeate VOC stream containing almost no $N_2$.

As further discussed infra, the VOCs selected for a study were methanol, acetone, methylene chloride and toluene. The concentration of such VOCs used in the $N_2$ feed gas at essentially atmospheric pressure was generally around 200–300 ppmv. A few examples utilized 990 ppmv of VOC. The permeate side vacuum was 28.4 inch Hg or upwards.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may also be seen on other views.

Cyclic Flow Swing Membrane Permeation Process

As illustrated in FIG. 1, in the FSMP embodiment of the present invention, a membrane module 10 is utilized wherein the feed gas mixture 12 is cyclically introduced into the feed channel inlet 14 and flows on one side of the membrane 16 and exits at the end of the membrane feed channel. On the other (permeate) side of the membrane, the permeate channel conditions arc maintained, e.g. by an evacuation means, for permeation of the feed gas species from the feed side to the permeate side. This condition may be created by having the permeate side total pressure less, or very much less, than the feed side total pressure; alternately there may be a sweep fluid (gas or liquid) flowing on the permeate side to ensure that $p_i<<P_i$. This mode of gas permeation, when carried out in a steady state manner, results in conventional membrane gas permeation processes. Importantly, the present invention provides feed gas flow into the membrane device feed channel in an intermittent or cyclic manner.

Furthermore, the Flow Swing Membrane Permeation (FSMP) device does not utilize a contained liquid membrane; that is, for the embodiment of the FSMP illustrated in FIG. 2, only a polymeric VOC-selective layer 8 on the hollow fiber is used as the selective membrane, wherein the membrane 16 has a much lower VOC-$N_2$ selectivity and the permeate stream in this case has limited enrichment in the VOCs. For other gas separation systems (e.g. $CO_2$ removal), the selective skin layer may have a very high selectivity for the species or component to be removed.

In either the FSMP or FSMABP/FSLMP aspects, the permeate evacuation means preferably includes a vacuum means for maintaining a vacuum pressure in the exit chamber, and a condensing means for condensing the component which exits the exit chamber. The vacuum means may be passive (i.e., no vacuum applied) if the feed gas is at a relatively high pressure differential with the evacuation means, preferably ranging from greater than about 1 to 20 atmospheres, or higher. Alternatively, the evacuation means may comprise a sweep gas or sweep vapor means for continuously or periodically passing a sweep gas through the permeate side of the system. For example, steam vapor can be used to strip the component. Thus, the evacuation of the permeate from the shell side may be accomplished by a vacuum pump or a sweep gas or sweep vapor (such as steam). A combination of vacuum means and sweep gas/vapor means may also be used. In addition, operation of a vacuum pump or a sweep gas may not be necessary if feed gas is forced into the device 10 at a sufficiently high pressure, e.g., up to 10 to 15 atmospheres, although levels up to 20 atmospheres are possible. In any case, the permeate may be passed through a condenser which may contain a liquid solvent, which is substantially the condensed component, e.g., the VOC.

FIGS. 2–4 illustrate a species A, for example in a particular case where a volatile organic compound (VOC) present as a vapor on the feed side is being removed by selective permeation through a silicone coated hollow fiber membrane 20 from a nitrogen or air feed gas stream 12.

As illustrated in FIG. 2, for a short period of time, say 10 seconds or 20 seconds or 1 minute, etc., the feed gas 12 flows into the membrane channel 22 which has a feed gas pressure associated therewith. That period of time may be referred to as the absorption or adsorption time $t_{ads}$. The front end of the feed gas stream 12 will be highly purified because the membrane 20 acts as an adsorber for species A. During this time, the permeate side pressure is maintained lower than the feed side pressure, or the permeate side is maintained under vacuum, or a sweep fluid is passed over the permeate side, so that the feed gas species permeate through the membrane to the permeate side.

As illustrated in FIG. 3, after the adsorption time or absorption time, $t_{ads}$ is over, the feed gas flow 12 into the membrane feed channel 22 is stopped for an amount of time, $t_{reg}$, called the stripping time or regeneration time. The membrane feed channel exit is also closed, and no retentate stream is withdrawn. However, during this time, species A (e.g., the VOC) present in the remaining feed gas, the retentate, in the feed channel (especially near the back end, namely the feed entry location) will be preferentially removed by permeation through the membrane 20. Thus the gas remaining in the feed channel 22 will be highly purified in species B (e.g., $N_2$ or air). The gas pressure in the feed channel 22 may be marginally reduced from the feed gas pressure due to permeation through the membrane 20 during the short stripping or regeneration period ($t_{reg}$ seconds).

As illustrated in FIG. 4, after adequate purification of the remaining gas, the feed gas flow 12 into the membrane feed channel 22 is initiated again and a new cycle begins. The total cycle time $T_{cycle}$ (=$t_{ads}$+$t_{reg}$) is the sum of the adsorption time and the regeneration time.

When the feed gas 12 is reintroduced into the membrane feed channel 22 after the regeneration time is over, the gas that is pushed out first as the retentate stream at the exit end is very highly purified in species B. Furthermore, the gas leaving the feed side exit location as the retentate during the short adsorption/absorption time $t_{ads}$, is highly purified in B. That is, the membrane facing the feed gas mixture 12 acts as an adsorber/absorber for species A in preference to species B. For example, a silicone rubber membrane absorbs a VOC in preference to $N_2$ or air. In a particular embodiment, a silicone rubber coating on the hollow fibers 20 may incorporate very fine zeolite or other adsorbents that will increase its capacity of absorbing/adsorbing gases and vapors. Thus during the short period of $t_{ads}$, the adsorption time or absorption time, the feed gas flowing into the feed membrane channel is purified due to removal of species A in the membrane acting as an adsorber/absorber. The retentate gas that leaves the membrane unit at the other exit end during this period is highly purified in B. Thus, the gas stream withdrawn as the retentate from the feed channel exit during the adsorption/absorption time after one cycle, is highly purified in species B due to two reasons: first, the gas left after regeneration time is highly purified in B; and second, the front end of the fresh feed gas introduced at the beginning of the absorption time gets highly purified by adsorption/absorption in the membrane acting as an adsorber/absorber.

In one preferred embodiment of the present invention, a polymeric hollow fiber membrane is utilized in a hollow fiber module (HFM), and in a particular embodiment, a thin film composite (TFC) membrane having a selective nonporous polymeric membrane coating on the outside diameter over a microporous substrate is used. In testing this particular embodiment of the present invention, the feed gas was allowed to flow into the fiber bore at close to atmospheric pressure and vacuum was maintained on the shell side of the hollow fiber device as discussed herein below. In another embodiment, the present invention may instead have the feed gas stream on the shell side and the permeate stream on the fiber bore side. In a different embodiment, the present invention could be used with a spiral-wound membrane unit; the feed side will be used for gaseous feed (feed gas) introduction, and the permeate side will be used for permeate withdrawal, say, under vacuum.

While FIG. 1 illustrates a FSMP-type apparatus 10 according to the present invention, which could utilize, e.g. a polymeric hollow fiber membrane 20, liquid membranes are also known to be efficient for gas separation as well. Contained liquid membranes are known to the skilled artisan, for example, as discussed in "A Modified Hollow Fiber Contained Liquid Membrane Technique for Gas Separation at High Pressures", Papadopoulos, T. H., and Sirkar, K. K., *J. Membrane Sci.*, 1994, 94, 163.

Figure 5:
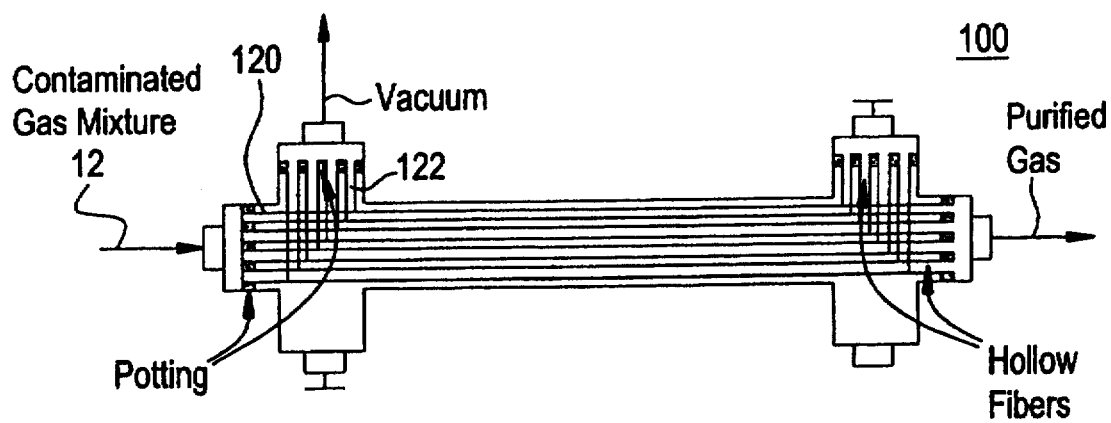
FIG. 5 is a schematic representation of a second preferred embodiment of the gas separation system of the present invention having a shell-and-tube configuration with two sets of hollow fibers and a liquid membrane disposed therebetween.

FIG. 5 schematically represents a flow swing membrane absorption-permeation (FSMABP) apparatus 100 and process of the present invention which employs a coated hollow fiber contained liquid membrane configuration.

Thus, in the second aspect of the present invention represented by the embodiment 100 shown in FIG. 5, the feed gas mixture 12 flows through the bores of one set of fibers 120 as used in the FSMP process of the present invention, i.e. the feed fibers, while the permeate gas stream flows through the bores of a second set of fibers 122, i.e. the strip or regeneration fibers, which may be of similar or identical size and/or configuration as the first set of fibers. Moreover, in between these fibers, the shell side is filled with a liquid 130 highly selective for species A which is to be removed from the feed gas stream 12.

In one particular experimental setup of this type, a VOC-containing $N_2$ stream was fed into the bores of the feed fibers 120 and a vacuum was pulled in the bores of the second set of fibers 122. A highly VOC-selective essentially nonvolatile oil, such as silicone oil or mineral oil could be used. A mineral oil (available under the name of Paratherm) was used as the liquid membrane in the experimental setup. As $N_2$ has an extremely low solubility in this liquid membrane 130, the permeate gas stream flowing through the second set of fibers was found to be virtually pure VOC. Thus, two essentially pure streams can be produced by the present invention. In the particular example tested, an essentially VOC-free $N_2$ stream from the exit end of the feed fibers 120 and an essentially VOC-containing vapor stream from the strip fibers 122 was obtained.

Figure 6:
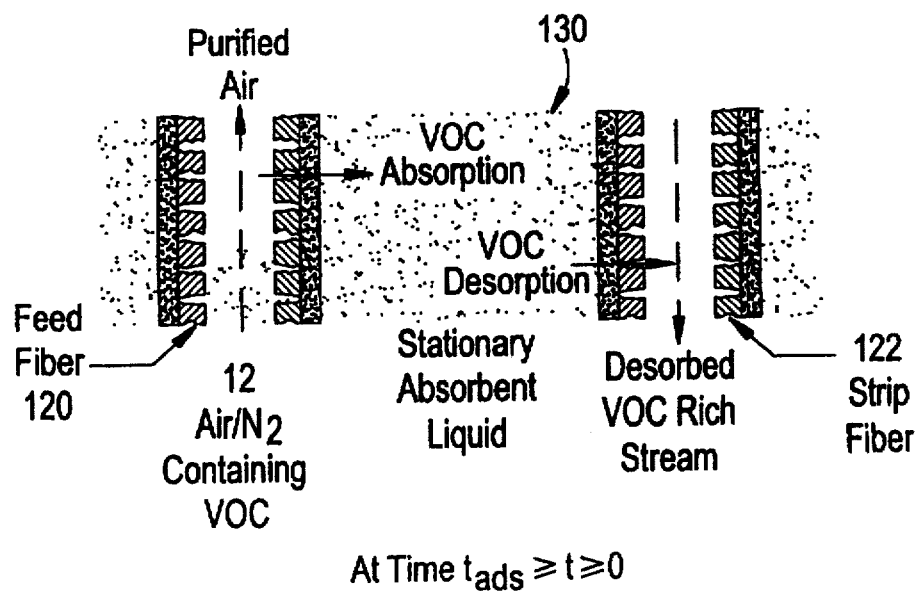
FIGS. 6–8 are cross-sectional representations of the hollow fiber of the second preferred embodiment of the present invention, for example as shown in FIG. 5, showing the nature of operation in flow swing membrane absorption-permeation, as described hereinbelow.

As illustrated in FIG. 6, as the VOC-containing $N_2$ stream 12 enters the feed fibers 120, the VOCs are absorbed first in the polymeric membrane 20 and then in the oil 130; the bed of oil as well as the membrane acts as an adsorber bed, thereby producing a very pure $N_2$ at the exit of the feed fibers 120. However, after a short adsorption/absorption time, $t_{ads}$, the feed gas flow 12 is stopped and both ends of the feed fiber 120 are shut off. Meanwhile, a vacuum is always maintained in the strip fibers 122, thereby constantly regenerating the bed of oil or liquid membrane 130 as well as the polymeric membrane of feed and strip fibers 120, 122.

Figure 7:
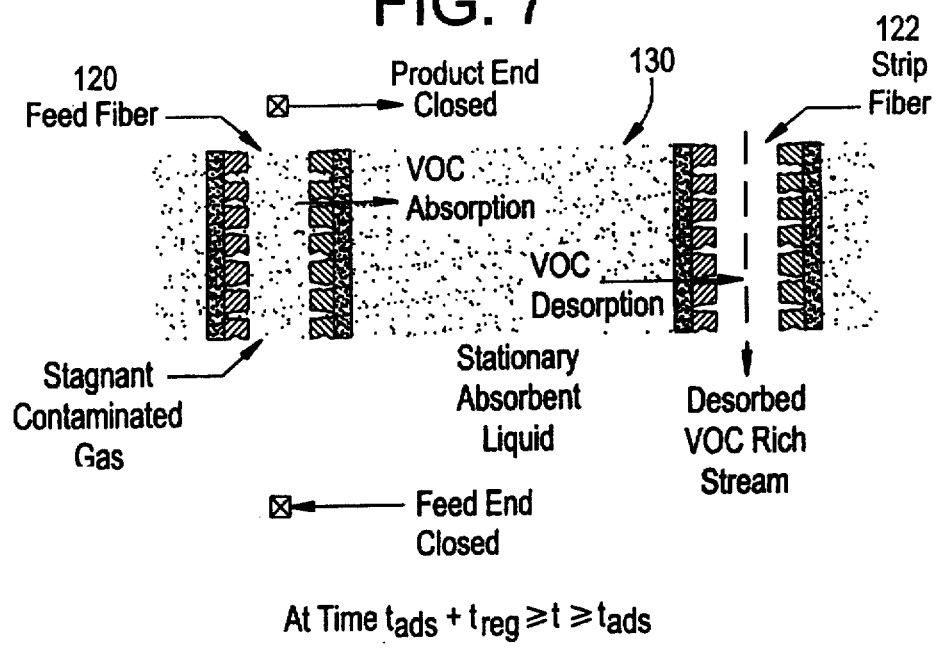

As illustrated in FIG. 7, during the next part of the cycle lasting for $t_{reg}$ seconds, the oil as well as the feed gas left in the feed fiber 120 are purified by selective permeation-based removal of the VOC. It should be noted that this purification also takes place during $t_{ads}$.

Figure 8:
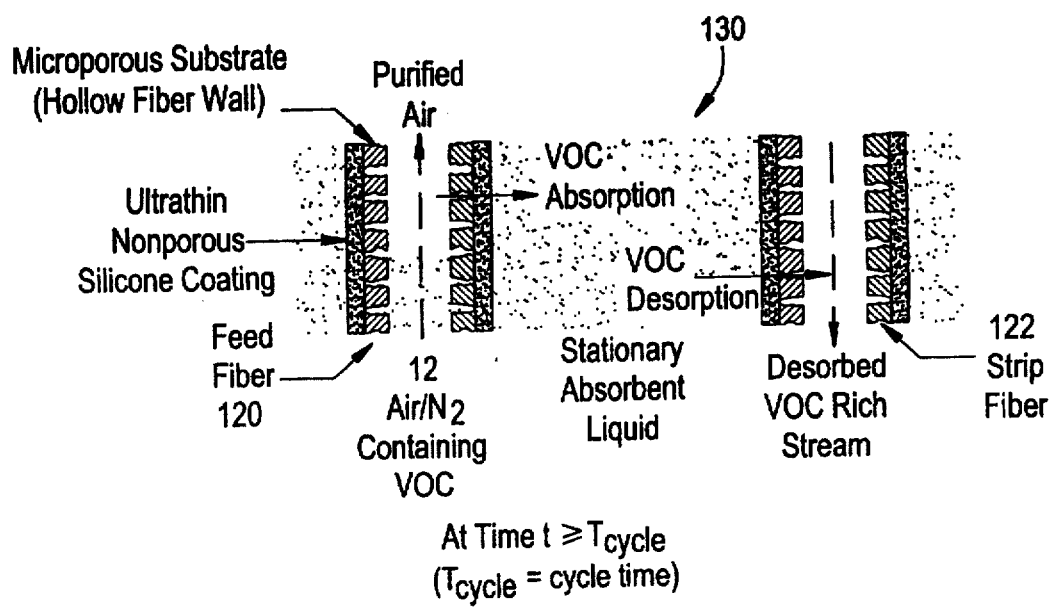

As illustrated in FIG. 8, after purification of the remaining gas takes place, the feed gas flow 12 into the membrane feed channel is initiated again and a new cycle begins. The total cycle time $T_{cycle}$ (=$t_{ads}+t_{reg}$) is the sum of the adsorption time and the regeneration time.

Moreover, the process may also be implemented in a different embodiment of the present invention by utilizing a single set of fibers, as in FIG. 1 with a supported or immobilized liquid membrane. For example, if a nonvolatile species A-selective liquid were immobilized in the pores of the porous substrate of the thin film composite hollow fiber membrane which is shown in FIG. 1, then an FSMABP process could also be successfully implemented.

Thus, the cyclic nature of flow swing membrane permeation (FSMP) or flow swing liquid membrane-permeation (FSLMP) or flow swing membrane absorption-permeation (FSMABP) of the present invention produces a time-dependent highly purified species B containing stream at the exit end of the membrane feed channel. To obtain a steady output flow, a surge drum may be utilized to collect the unsteady output of the process and a smaller steady stream may be withdrawn. Alternately, two, three or more membrane devices may be used in parallel with a programmed feed side inlet gas valve control, such that the sum of $t_{ads}$-s for the various membrane devices is equal to the cycle time, $T_{cycle}$, for the process. Similarly the sum of $t_{ads}+t_{reg}$ for each of the different membrane devices should equal the cycle time $T_{cycle}$ for the process.

The processes studied by Poddar et al. (cf. Membrane-Based Absorption of VOCs from a Gas Stream, *AIChEJ*, 1996, 42, 3267; Removal of VOCs from Air by Membrane-Based Absorption and Stripping, *J. Membrane Sci.*, 1996, 120, 221) involve a steady and continuous VOC absorption in a countercurrent membrane absorber (employing silicone oil or Paratherm® oil as an absorbent) and subsequent stripping of VOCs from the absorbent in a separate membrane stripper by vacuum as the absorbent is recirculated between the absorber and the stripper. In contrast, however, the present invention does not require pumping of viscous oil, and further avoids saturation or near-saturation of the absorbent at the front end since it is being continuously regenerated by vacuum. As a result, the present invention provides a more efficient purifier than previous devices. The present invention performs somewhat like an activated carbon bed, but does not require evacuation of any bed because an evacuation means such as a vacuum is being employed to continuously regenerate the membrane. Thus, regeneration within the present process is simple.

Experimental Setup

Three membrane modules were employed to test the FSMP and the FSMABP/FSLMP aspects of the present invention. Specifications for the Hollow Fiber Modules used in the testing are presented below in Table 1.

TABLE 1

Geometric Characteristics of Hollow Fiber Modules

| Module No. | 1 | 2 | 3 |
|---|---|---|---|
| Type of Fiber | Celgard* with a silicone skin | Celgard* with a silicone skin | Celgard* with a silicone skin |
| Fiber ID (cm) | 0.024 | 0.024 | 0.024 |
| Fiber OD (cm) | 0.030 | 0.029 | 0.029 |
| Effective Length (cm) | 20.5 | 42.5 | 25.4 |
| Shell ID (cm) | 0.80 | 0.92 | 0.46 |
| No. of Fibers | 300 | 150** | 50 |
| Void Fraction (%) | 57.81 | 70.19 | 80.09 |
| Mass Transfer Area ($cm^2$)*** | 579.6 | 580.80 | 115.7 |
| Mass Transfer Area/Volume ($cm^2$)/($cm^3$)*** | 56.25 | 29.29 | 27.75 |

*AMT, Inc., Minnetonka, MN
**Number of fibers in each set
***Calculation based on outer diameter of the fiber As shown in Table 1, Module # 1 has a single set of 300 fibers; these fibers are microporous polypropylene hollow fibers (Hoechst Celanese, SPD Charlotte, N.C.) X-10 (0.03 $\mu$m pore size) with a thin plasma polymerized nonporous coating of silicone on the outside diameter (prepared by AMT Inc., Minnetonka, Minn.). Module # 2 has two sets of 150 identical fibers, each fiber set having a separate inlet and outlet. A discussion of the techniques of preparing these modules can be found in: Further Studies on Hollow Fiber Contained Liquid Membrane Separation of Gas and Liquid Mixtures, Papadopoulos, T. H., Ph.D. Dissertation, Stevens Institute of Technology, Hoboken, N.J., 1992.

Figure 9:
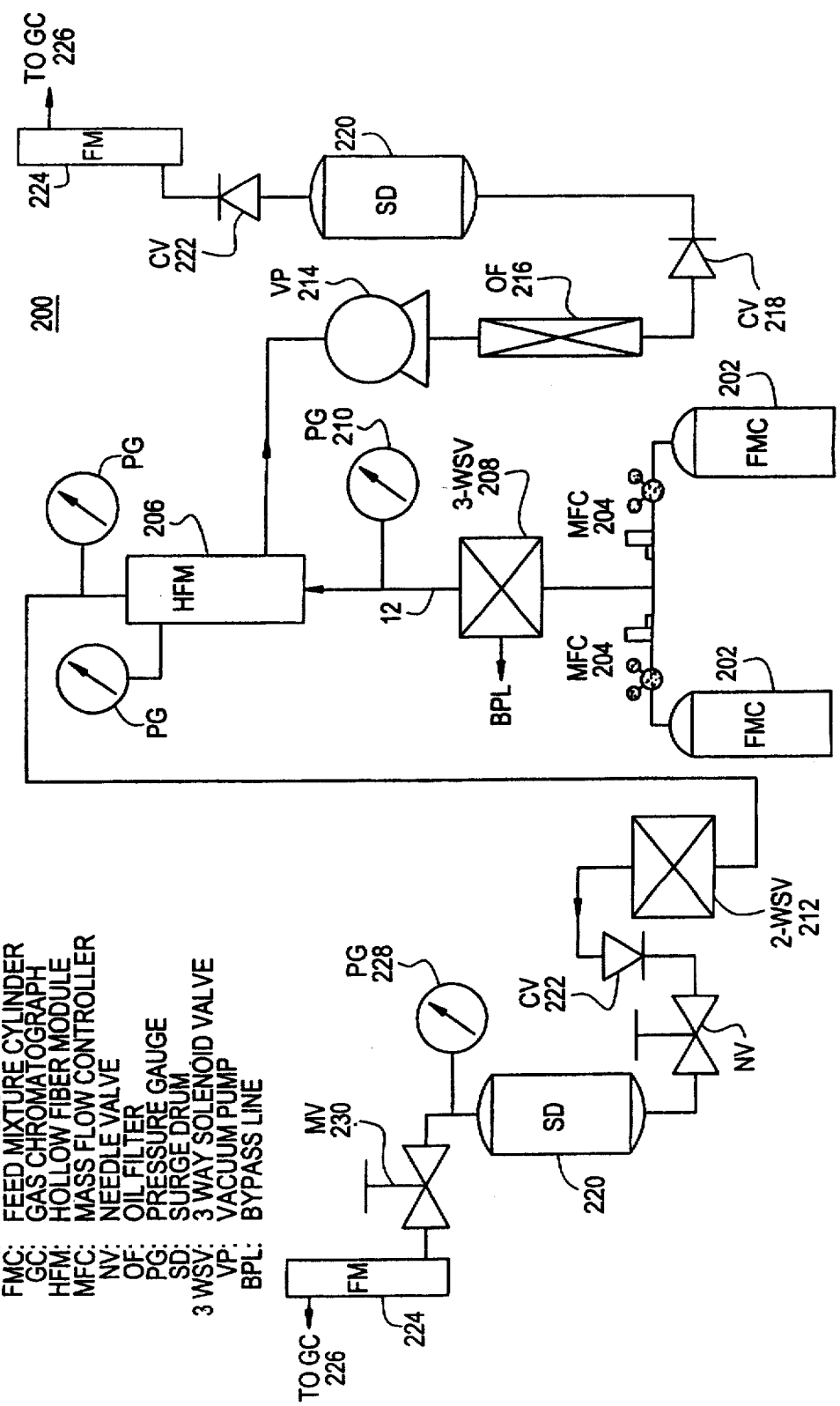
FIG. 9 is a schematic representation of the experimental setup for testing flow swing membrane permeation in a preferred embodiment of the present invention.

FIG. 9 schematically illustrates an experimental setup 200 for Flow Swing Membrane Permeation (FSMP). A mixture of the VOC and nitrogen from a cylinder 202 was passed through a mass flow controller 204 and was mixed with pure nitrogen from another cylinder 202 and through another mass flow controller 204 to prepare a feed mixture having the desired composition. This gas mixture was fed through the bores of the hollow fibers in an HFM 206 for a short time; then the feed gas flow was stopped by a 3-WSV valve 208 obtainable from Components and Control, Carlstadt, N.J., at the inlet of the cylindrical hollow fiber module 206. A pressure gauge 210 monitored inlet feed gas pressure. At the treated gas exit, a 2-WSV valve 212 was used. For a short time, both valves 208, 212 were open for the feed 12 to enter and the purified gas to exit the tube side of the module 206. VOCs from the feed stream 12 permeated through the silicone coating of the hollow fibers into the shell side where desorption was constantly taking place as the vacuum was constantly applied by a vacuum pump 214. The permeate flow was passed through an oil filter 216 and check valve 218 into a surge drum 220. The outlet of the surge drum 220 was connected to another check valve 222 and a flow meter 224. The outlet flow was then directed to a gas chromatograph 226. Similarly, the outlet end of the purified feed mixture was connected to a check valve 222 and a downstream surge drum 220, whose outlet was monitored by a pressure gauge 228 and controlled by a metering valve 230 for passage through a flow meter 224 and subsequent delivery to a gas chromatograph 226. Pressure difference between the feed and the vacuum side created the partial pressure driving force for the removal of the VOCs. Opening and closing of these two solenoid valves 208, 212 were simultaneously controlled with a single timer. Concentrated permeated stream and purified feed gas were analyzed in the gas chromatograph 226. For steady state operation, the solenoid valves 208, 212 were turned off so that the feed gas mixture 12 could flow continuously into the membrane module 206 and the product gas was removed continuously from the fiber bore at exit.

Figure 10:
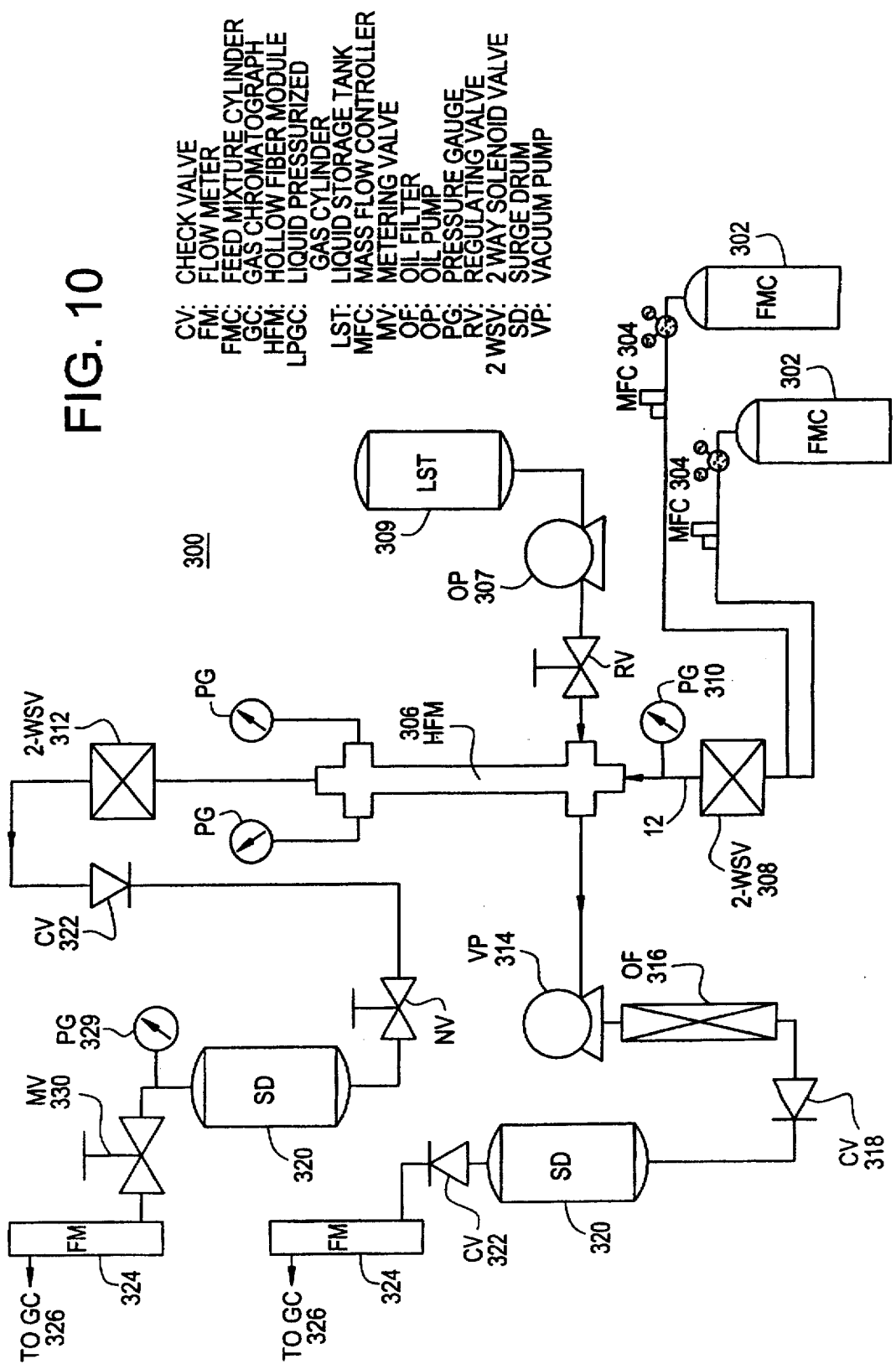
FIG. 10 is a schematic representation of the experimental setup for testing flow swing membrane absorption-permeation in a preferred embodiment of the present invention.
Figure 11:
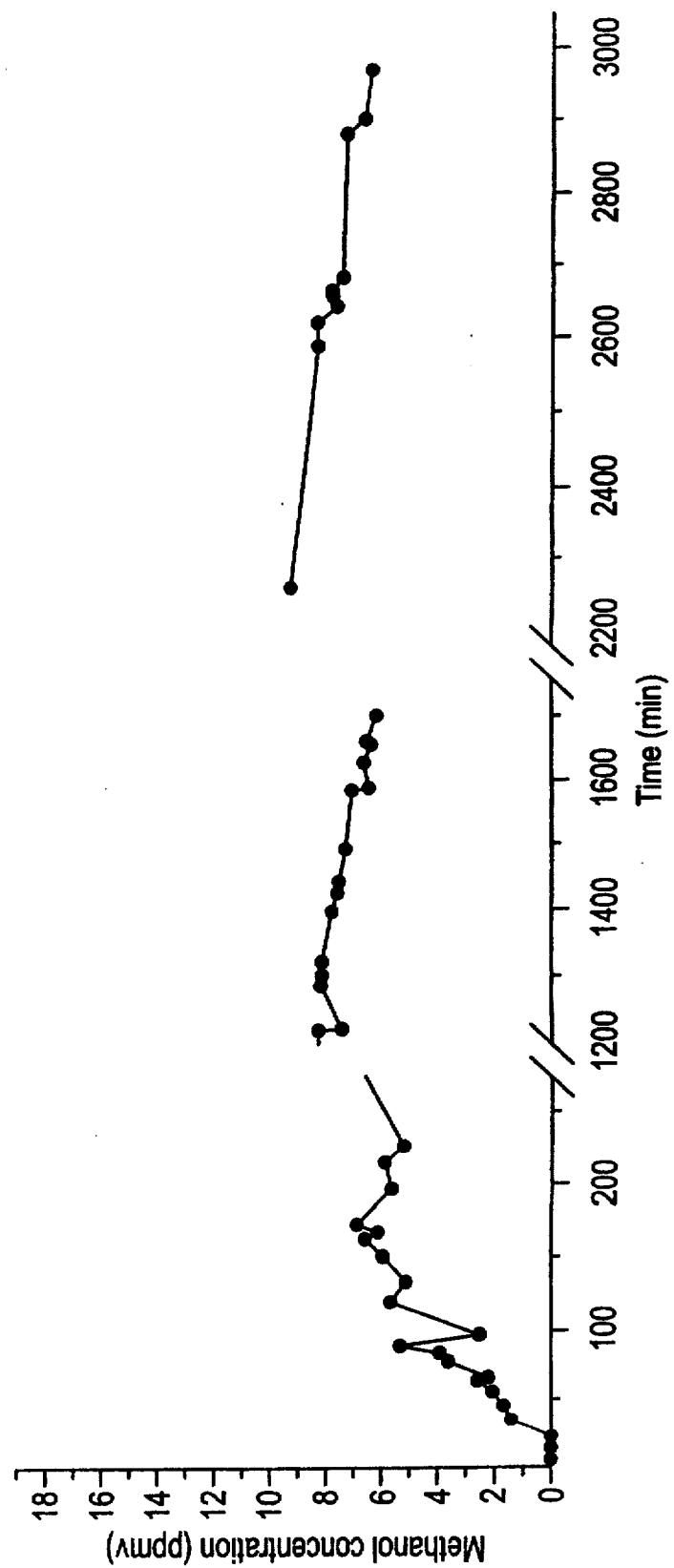

FIG. 10 schematically shows an experimental setup 300 constructed to demonstrate FSMABP. A mixture of the VOC and nitrogen from a cylinder 302 was passed through a mass flow controller 304 and was mixed with pure nitrogen from another cylinder 302 and through another mass flow controller 304 to prepare a feed mixture having the desired composition. This gas mixture 12 was fed through the bores of one set of fibers for a short time; then the feed gas flow 12 was stopped by a two-way solenoid valve 308 by Components and Control, Carlstadt, N.J. The outlet end of the feed mixture 12 also had a similar solenoid valve 312 which worked in perfect synchronization with the one at the feed inlet end. Both two-way solenoid valves 308, 312 were controlled by a single timer. The feed flow rate 12 was controlled by an electronic mass flow metering valve made by Matheson, E. Rutherford, N.J. A pressure gauge 310 monitored inlet feed pressure.

The shell side of the hollow fiber module 306 had been previously filled with silicone oil, viz. Silicone 200®, Dow Corning, Midland, Mich., through a check valve using a pump 307 which drew oil from a liquid storage tank 309. Once the shell side was filled with the oil, both ends of the shell side were kept closed. The pressure of the silicone oil was maintained at 10 psig which was always higher than the incoming feed gas pressure (~5 psig) in order to prevent bubbling, as described in Membrane-Based Absorption of VOCs from a Gas Stream by Poddar et al., as referenced hereinabove.

During the part of the cycle corresponding to direct absorption of the VOC from the flowing feed stream, the VOC permeated through the silicone coating of the hollow fibers selectively over $N_2$/air and was absorbed in the stationary absorbent liquid, i.e. silicone oil, on the shell side of the cylindrical module 306. A continuous vacuum, which was applied through the tube side of the second set of fibers, i.e. the strip fibers, provided a continuous driving force for the desorption of the VOCs from the absorbent liquid. The driving force was provided by a vacuum pump 314. The permeate flow was passed through an oil filter 316 and check valve 318 into a surge drum 320. The outlet of the surge drum 320 was connected to another check valve 322 and a flow meter 324. The outlet flow could thus be directed to a gas chromatograph 326. Similarly, the outlet end of the purified feed mixture was connected to a check valve 322 and a downstream surge drum 320, whose outlet was monitored by a pressure gauge 329 and controlled by a metering valve 330 for passage through a flow meter 324 and subsequent delivery to a gas chromatograph 326. Thus the VOCs in the silicone oil were desorbed and then permeated through the silicone coating of the second set of hollow fibers. This concentrated stream was collected in a surge vessel 320. The purified gas was collected in another surge vessel 320 at the feed outlet end during the first part of the absorption cycle, i.e. (when the solenoid valve 312 at the feed outlet end was open) and was sent for analysis to a gas chromatograph 326 (GC), model Star 3400 from Varian of Sugariand, Tex.

All connecting lines used for these experiments were ⅛-inch soft copper tubing (McMaster Carr, New Brunswick, N.J.). Inlet feed pressure and the vacuum level were measured with pressure gauges (Matheson, E.Rutherford, N.J.). All gas mixtures used for these experiments were obtained from Matheson Gas Products (Matheson, E.Rutherford, N.J.).

Experimental Results

The removal of VOCs from $N_2$ by two processes according to the present invention, FSMABP and FSMP, are presented below.

Module 1 was used to study the FSMP-based separation. Module 2, containing two sets of fibers, was employed for FSMABP studies with silicone oil on the shell side. Module 3 was used in addition for comparing steady state performance with FSMP performance. The cycle time, $T_{cycle}$, was varied initially over a wide range. Afterwards, $T_{cycle}$ was varied by up to 120 seconds, although typically limited to 20–40 seconds. Usually a run was carried out for a period of 4–8 hours. Results described here were obtained after a considerable number of cycles, for example, after 2–3 hours, while some runs were continued for over 24–36 hours, although essentially no differences were observed in performance over these extended periods.

Table 2 shows results of the FSMP process for purification of methanol-containing $N_2$ streams employing Module 1 containing a single set of silicone rubber coated hollow fibers.

TABLE 2

FSMP Experiments* for Methanol Separation from $N_2$

| Total** Cycle Time (s) | | 20 | 20 | 20 | 20 |
|---|---|---|---|---|---|
| Gas | Feed | 100 | 80 | 60 | 30 |
| Flow Rate | Product | 23.4 | 18.3 | 13 | 5.5 |
| (cc/min) | Permeate | 26.6 | 21.7 | 17 | 9.5 |
| VOC | Feed | 259 | 265 | 279 | 298 |
| Concentration | Product | 19 | 13 | 7 | 2 |
| (ppmv) | Permeate | 1428 | 1452 | 1299 | 831 |
| Surge*** Drum Pressure (psig) | | 5 | 4 | 3 | 1 |
| Feed Pressure (psig) | | 6 | 5 | 4 | 2 |
| Vacuum (in Hg) | | 28.4 | 29.2 | 29.2 | 29.2 |

*All runs were for ~ 20 hours
**$t_{ads}$, $t_{reg}$ = 10 sec
***Product surge drum volume: 150 cc These silicone rubber coatings have much lower selectivities for VOC over $N_2$, especially at these low VOC concentrations. As a result, the permeate stream VOC concentrations are not expected to be high. In particular, Table 2 provides the results for methanol separation from $N_2$. As the feed gas flow rate was reduced from 100 cc/min to 30 cc/min, the methanol concentration in the treated gas was reduced from 19 ppmv to 2 ppmv. Correspondingly, the permeate methanol concentration was reduced from 1428 ppmv to 831 ppmv. Obviously the permeate side enrichment was low since the feed inlet concentration was around 259–298 ppmv and the membrane selectivity was not high.

Table 3 shows the separation performances of the FSMP process for $N_2$ containing methylene chloride. As seen before, as the feed gas flow rate is reduced for a cycle time of 20 seconds ($t_{ads}$=10 seconds), the extent of the gas purification increases.

TABLE 3

FSMP Experiments* for Methylene Chloride Separation from $N_2$

| Total** Cycle Time (s) | | 20 | 20 | 20 | 20 | 20 |
|---|---|---|---|---|---|---|
| Gas | Feed | 100 | 80 | 60 | 60 | 30 |
| Flow Rate | Product | 23.4 | 20.0 | 12.6 | 12.4 | 4.8 |
| (cc/min) | Permeate | 26.6 | 20.0 | 17.4 | 17.6 | 10.2 |
| VOC | Feed | 330 | 339 | 321 | 319 | 335 |

TABLE 3-continued

FSMP Experiments* for Methylene Chloride Separation from $N_2$

| Total** Cycle Time (s) | | 20 | 20 | 20 | 20 | 20 |
|---|---|---|---|---|---|---|
| Concentration | Product | 13 | 12 | 12 | 2 | 1.5 |
| (ppmv) | Permeate | 1639 | 1578 | 1090 | 995 | 994 |
| Surge*** Drum Pressure (psig) | | 5 | 4 | 3 | 3 | 1 |
| Feed Pressure (psig) | | 6 | 5 | 4 | 4 | 2 |
| Vacuum (in Hg) | | 29 | 29 | 29 | 29.6 | 29 |

*All runs were for ~ 20 hours
**$t_{ads}$, $t_{reg}$ = 10 sec
***Product surge drum volume: 150 cc The purified $N_2$ stream had only 1.5 ppmv of the VOC. For a feed flow rate of 60 cc/min, a higher level of purification was achieved by a higher vacuum level (29.6 in Hg compared to 29 in Hg).

Table 4 shows the results for purification of $N_2$ by membrane removal of acetone.

TABLE 4

FSMP Experiments* for Acetone Separation from $N_2$

| Total** Cycle Time (s) | | 20 | 20 | 20 | 20 |
|---|---|---|---|---|---|
| Gas | Feed | 100 | 80 | 60 | 30 |
| Flow Rate | Product | 23.2 | 17.9 | 12.6 | 5.6 |
| (cc/min) | Permeate | 26.8 | 22.1 | 17.4 | 9.4 |
| VOC | Feed | 348 | 331 | 338 | 330 |
| Concentration | Product | 36 | 26 | 22 | 3.1 |
| (ppmv) | Permeate | 1085 | 1270 | 1195 | 862 |
| Surge*** Drum Pressure (psig) | | 5 | 4 | 3 | 1 |
| Feed Pressure (psig) | | 6 | 5 | 4 | 2 |
| Vacuum (in Hg) | | 29.1 | 28.4 | 29.2 | 28.4 |

*All runs were for ~ 20 hours
**$t_{ads}$, $t_{reg}$ = 10 sec
***Product surge drum volume: 150 cc Again, the purification behavior is similar, although acetone is somewhat more difficult to remove, and hence, the treated $N_2$ gas has somewhat higher concentrations.

Table 5 illustrates the results obtained for FSMABP separation of methanol from the feed $N_2$ stream.

TABLE 5

Experimental Results for FSMABP for Methanol Separation from $N_2$ in Module 2

| VOC | Total Cycle Time (s) | Absorption Time (s) | Gas Flow Rate (cc/min) | | VOC Concentration (ppmv) | |
|---|---|---|---|---|---|---|
| | | | Feed | Product | Feed | Product |
| Methanol | 20 | 10 | 26 | 12 | 191 | 91 |
| | 20 | 10 | 6 | 3 | 207 | 19 |
| | 20 | 10 | 3.3 | 1.5 | 261 | 5 |
| | 40 | 20 | 6 | 3 | 204 | 16 |
| | 80 | 40 | 6 | 3.5 | 225 | 22 |

As the feed gas flow rate was decreased from 26 cc/mi to 3.3 cc/min, the methanol concentration in the treated gas from the surge drum was reduced from 91 ppmv to 5 ppmv for processes with $T_{cycle}$=20 seconds and $t_{ads}$=10 seconds. Obviously, at higher feed gas flow rates, the absorption capacity of the system is limited and the extent of gas purification becomes less and less. However, when the gas flow rate is brought within an acceptable operating range, the absorption capacity of the system can handle the VOC load and delivers the purified gas at 5 ppmv or lower.

Table 5 further shows that an increase in $t_{ads}$ (and therefore an increase of $T_{cycle}$) from 10 seconds to 40 seconds (such that $T_{cycle}$ values correspondingly increased from 20 to 80 seconds) marginally increases the VOC concentration in the treated gas.

Table 6 illustrates a somewhat similar behavior for the removal of methylene chloride.

TABLE 6

Experimental Results for FSMABP for Methylene Chloride Separation from $N_2$ in Module 2

| VOC | Total Cycle Time (s) | Absorption Time (s) | Gas Flow Rate (cc/min) | | VOC Concentration (ppmv) | |
|---|---|---|---|---|---|---|
| | | | Feed | Product | Feed | Product |
| Methylene Chloride | 110 | 10 | 30 | 3 | 207 | 104 |
| | 20 | 10 | 6 | 2.5 | 290 | 15 |
| | 40 | 20 | 10 | 5 | 292 | 43 |
| | 40 | 20 | 6 | 3 | 285 | 15 |
| | 80 | 40 | 30 | 16 | 206 | 96 |
| | 80 | 40 | 10 | 5 | 285 | 38 |
| | 80 | 40 | 6 | 3 | 284 | 21 |

As the feed flow rate is reduced from 30 cc/min to 6 cc/min for $t_{ads}$=40 seconds ($T_{cycle}$=80 seconds), the VOC concentration in the treated gas is reduced to 21 ppmv. For 6 cc/min feed flow rate, at two other smaller $t_{ads}$ values, e.g., 20 and 10 seconds, the treated gas compositions are somewhat lower, i.e. 15 ppmv, respectively. At lower feed gas flow rates and lower values of $t_{ads}$, the extent of gas purification will be increased considerably. As silicone oil has an extremely low solubility for $N_2$, the permeate stream was essentially pure VOC.

Table 7 provides data points obtained by purification of nitrogen streams containing either toluene or acetone.

TABLE 7

Experimental Results for FSMABP for Toluene and Acetone Separation from $N_2$ in Module 2

| VOC | Total Cycle Time (s) | Absorption Time (s) | Gas Flow Rate (cc/min) | | VOC Concentration (ppmv) | |
|---|---|---|---|---|---|---|
| | | | Feed | Product | Feed | Product |
| Toluene | 40 | 20 | 30 | 15 | 253 | ~0 |
| | 40 | 20 | 25 | 12 | 253 | ~0 |
| Acetone | 40 | 20 | 15 | 6 | 331 | 169 |
| | 40 | 20 | 6 | 2.5 | 284 | 21 |

The purification of $N_2$ was very high for the case of toluene; toluene was not detectable in the treated gas. Silicone oil is a very good absorbent for toluene, which is consistent with those of Poddar et al., supra, who also observed that toluene absorption in silicone oil was much better that those of methylene chloride, acetone and methanol.

FIG. 11 illustrates how the concentration of the treated gas in an FSMP apparatus varies with time over an extended period for the system methanol/nitrogen for a feed flow rate of 60 cc/min and a feed concentration 279 ppmv and $t_{ads}$, $t_{reg}$=10 s. The initial low value is due to pure $N_2$ in the surge tank. Within 2–3 hours, a steady state is reached. Any fluctuation in the output values is due to fluctuations in temperature and vacuum.

It should be noted that the steady state response of the cyclic process is provided in every one of the tables contained herein.

The process of FSMP was compared with a conventional steady state mode of gas separation using Module #3. Vacuum was used on the permeate side in both cases. A few results for acetone are presented in Table 8.

TABLE 8

Comparison of FSMP Process and the Conventional Steady State Gas Permeation Process for Separation of Acetone from $N_2$ Using Module #3

| Component (mode of operation) | Acetone (cyclic) | Acetone (steady state) | Acetone (cyclic) | Acetone (steady state) |
|---|---|---|---|---|
| Total* Cycle Time (s) | 20 | | 20 | |
| Feed Comp. (ppmv) | 990 | 990 | 990 | 990 |
| Product Comp. (ppmv) | 67 | 330 | 16 | 242 |
| Permeate Comp. (ppmv) | 3144 | 10806 | 1969 | 8998 |
| Feed Flow Rate (cc/min) | 100 | 100 | 80 | 80 |
| Product Flow Rate (cc/min) | 17.7 | 94 | 8.2 | 95 |
| Surge Drum Press.** (psig) | 5 | 5 | 5 | 5 |
| Feed Press. (psig) | 6 | 6 | 6 | 6 |
| Vacuum (in Hg) | 29.5 | 29.2 | 29.5 | 29.3 |

*$t_{ads}$, $t_{reg}$ = 10 sec
**Product surge drum volume: 150 cc

It is seen that, for a feed flow rate of 80 cc/min, steady state operation leads to a purified product level of 242 ppmv, whereas under the same flow rate, the treated feed gas VOC concentration under the FSMP cyclic process of the present invention is 16 ppmv. It is further seen that, for a feed flow rate of 100 cc/min, steady state operation leads to a purified product level of 330 ppmv, while the treated feed gas VOC concentration under the FSMP cyclic process of the present invention is 67 ppmv.

Thus, the FSMP process of the present invention yielded almost an order of magnitude improvement in feed gas purification over the steady state process.

Thus, the present invention, whether in the form of the FSMABP or the FSMP process, provides an improvement in gas purification over known devices and processes, for example as may be appreciated by comparing methanol removal results with the results presented by Poddar et al. in "Removal of VOCs from Air by Membrane-Based Absorption and Stripping," supra. Both Table 2 and Table 5 show that methanol concentration may be reduced to very low levels, i.e. 1.5 ppmv and ~2 ppmv, respectively, at low gas flow rates, while Poddar et al. had difficulty in reducing the concentration to a level lower than 25 ppmv at low gas flow rates. Moreover, the demands of stripping were quite high in Poddar et al. since all of the absorbent had to be stripped to a low level. That is not a requirement with the present invention.

Furthermore, the present invention does not require a separate step of absorbent stripping, and the level of contamination of the front end of the absorbent can be easily maintained at a low level, thereby ensuring very high levels of gas purification.

As demonstrated herein, an experimental validation of the inherent superiority of the present invention regarding high purification of gaseous mixtures was achieved.

The present invention achieves gas purification by cyclically-operated membrane permeation. The present invention does not require drastic changes of pressure on either side of the membrane, as is required in pressure swing adsorption processes or their corresponding membrane process analogs. The present invention provides a relatively simple and demonstratably effective means of providing a very high degree of feed gas purification. If a highly selective membrane is also provided, the permeate stream can be highly purified too. The present invention can effectively replace known devices, for example, activated carbon beds, for gas purification. Furthermore, the ability to employ suitable nonvolatile liquid absorbents to drastically increase the membrane selectivity may be an added advantage with the present invention.

The present invention may be utilized in a variety of processes. For example, by using an $O_2$-selective membrane, $N_2$-enriched air with very little $O_2$ may be produced; or by using a $CO_2$-selective membrane, methane from natural gas can be highly purified; using a membrane that is highly selective for olefins over paraffins, a paraffinic feed gas may be purified of olefins to a very high degree just as a highly olefin-rich permeate will be produced. Using a highly $H_2O$-selective membrane, essentially dry gas may be produced. These examples are merely illustrative of some of the many processes possible with the present invention.

For a hollow fiber with a rubbery membrane coating, the preferred configuration for gas flow in FSMP are as follows. The microporous hollow fiber substrate used in experimental testing of the present invention had a high porosity around 0.3. As evident, for example, from Pinnau et al., "Gas Permeation through Composite Membranes," J. Membrane Sci., 37, 81 (1988), if feed is imposed on an ultrathin silicone coating and vacuum is applied through the substrate pores (fiber bore side), there will be considerable pressure drop in the permeate flow through the pores, which will reduce the driving force across the coating significantly, leading to poorer separation. Therefore, the strategy of passing feed flow through the fiber lumen was adopted in these experiments. The VOC in the feed gas then diffuses through the relatively very open porous substrate until encountering the nonporous silicone coating as seen in FIGS. 2, 3, 4, 6, 7 and 8. Essentially all the available vacuum is applied to the other side of the nonporous coating, i.e. the shell side. The partial pressure driving force is maximized and the achieved separation is much higher. Further, by passing the feed gas through the tube-side, any shell-side bypassing is avoided, which is very important for achieving high purification of the gas mixture.

The substrate in the coated fibers plays other important roles as well. It provides mechanical strength due to a very good bonding to the plasma-polymerized coating of rubbery silicone, the flux through which is likely to control the separation. The substrate and the coating must both be chemically resistant to VOCs for embodiments intended for use therewith. The silicone coating and the polypropylene substrate in the fibers are quite inert.

Thus, a preferred embodiment of the present invention comprises passing feed flow (i.e. the flow to be purified) on the tube side, which is porous, wherein the nonporous skin or coating is on the outside. Alternately, the present invention may be practiced with a porous hollow fiber membrane which has a nonporous skin on the inside, or tube side.

The VOC mole fraction in the permeate is typically much higher than that in the feed. A high or strong vacuum level on the permeate side is desirable. However, as production of a high vacuum is prohibitively expensive for industrial processes, a low vacuum may be preferred and may still be fully effective. Typical hollow fibers such as those used in the experimental apparatus described below can withstand tube side pressurization up to a pressure difference of 200–300 psig. If the feed VOC concentration is high, the membrane efficiency will not be fully utilized unless the vacuum level is very high. One way to solve the problem is to have a controlled introduction of sweep $N_2$ on the permeate side to reduce the permeate partial pressure of the VOC. This will overcome the limitation that the VOC concentration in the feed gas can be only 20,000 ppmv as described in Baker, U.S. Pat. No. 4,553,983.

Because the VOC-containing feed gas mixture flows over the non-skin side of the membrane, i.e., the side having the microporous substrate to promote pore adsorptioncum-condensation, and because the permeate side total pressure is usually lower than the feed gas pressure for evacuation means such as vacuum means, it is important that a very good bond exists between the rubbery VOC-selective coating/skin and the asymmetric hydrophobic microporous membrane substrate. Otherwise, delamination and membrane rupture would result. Plasma polymerized membranes of, for example, silicone or silicone copolymers, on symmetric porous/microporous and asymmetric substrates are particularly suitable due to the excellent bonding developed between the silicone skin and the substrate during plasma polymerization. One particularly suitable example is the plasma polymerized silicone coating membrane of Applied Membrane Technology, AMT, Inc., Minnetonka, Minn.

The microporous hydrophobic symmetric (Celgard®-type) or asymmetric substrate supports for the nonporous thin coating may include, but are not limited to, membranes made of polysulfone, polyetherimide, polyvinylidene fluoride, polyamide, polypropylene, polyethylene, polymethylpentene, and polytetrafluoroethylene, etc. These materials should have significant solvent resistance but encourage solvent surface adsorption.

Good candidates for the material for the nonporous ultrathin VOC-selective rubbery coating membrane include, but are not limited to, polydimethylsiloxane (silicone rubber), nitrile rubber, neoprene rubber, silicone-polycarbonate and all other copolymers, fluoroelastomers, polyurethane, polyvinylchloride, polybutadiene, polyolefin elastomers, polyesters, and polyethers. These materials must be thermoplastic. Those that can be applied via plasma polymerization are especially preferred. The rubbery membrane must develop good bonding with the polymeric microporous hydrophobic symmetric or asymmetric support substrate membrane so that it can withstand the pressure difference imposed on the skin through the so-called porous support/substrate.

The thickness of the nonporous or rubbery membrane can be in the range from 250 Å up to 25 $\mu$m. Thicknesses ranging from just under 1 $\mu$m to 3 $\mu$m have been used in removing VOCs.

Putting oil absorbents or other absorbents in pores greatly increases selectivity, although flux decreases. The oil must be nonvolatile, such as polyethylene glycol or polypropylene glycol. Examples of suitable absorbent liquids are dimethyl/polymethyl siloxanes, mineral oils, paraffinic oils, vegetable oils, heat transfer fluids, aqueous solutions of alkanolamines, hindered amines, pure polar hydrocarbons (n-methylpyrollidone, dimethylsulfoxide, sulfolane, etc.), and synthetic hydrocarbon solvents. More specifically, the examples may include silicone oil, Paratherm, Syltherm, Dowtherm, Calflo, Therminol, Syntrel, Isopar, and Norpar. For removal of $CO_2$ from air/$N_2$, the liquid may be glycerine, polyethylene glycol, or polypropylene glycol, or the like, and the liquid may contain dissolved $Na_2CO_3$, $K_2CO_3$, etc. For removal of olefin from paraffin, glycerol, polyethylene glycol, or polypropylene glycol, or the like, may be used with dissolved silver nitrate, or the like.

If the feed gas has a relatively high concentration of the component to be removed, as the component is adsorbed onto the porous membrane, the component concentration is reduced along the path of the feed gas through the system. This could result in increased $N_2$ flux through the pores closer to the feed gas exit since these pores will contain less condensed gas, which allows greater $N_2$ flux. Therefore, a component (e.g., VOC) selective coating as the nonporous membrane is preferred to avoid large values of $N_2$ flux.

Plasma polymerization is one of the preferred ways to develop bonding, especially for strong vacuum evacuation means applied to the permeate side of the membrane although dip-coating, interfacial polymerization, coating, and other methods of depositing and bonding could be used.

Plasma polymerization develops a very thin layer. Other techniques will develop a non-porous skin with somewhat lower bond strength, necessitating lower operating pressure differentials. Membrane thicknesses may be smaller with interfacial polymerization. Dip-coating will also work, albeit with a much lower bond strength. These other techniques are preferably used with sweep gases.

Plasma polymerization deposits nonporous material onto, and into, the pores of the porous substrate, creating a very fine capillary in the pore, which extraordinarily increases the selectivity of the composite membrane. Thus, casting a thin layer of nonporous material such as silicone rubber onto a microporous substrate or porous substrate having micropores such as a hydrophobic ultrafiltration membrane results in a novel permselective material.

It should be noted that the membranes may assume various sizes and shapes without departing from the scope of the invention. For example, the porous membrane may assume the configuration of a spiral-wound device, a baffled device, or a flat membrane device having flat porous and nonporous layers which abut each other. Furthermore, the device may assume any of various orientations, e.g., horizontal, vertical, or oblique, to name a few.

It should also be noted that the combination of the porous and nonporous membranes may be labeled for convenience variously as a "composite membrane", or more aptly a "thin film composite membrane", or a "single permselective membrane having a porous side with continuous pores or pits or cavities, and a nonporous side", because an embodiment which utilizes an ultrathin layer of silicone rubber or the like on a porous substrate might appear to be a single membrane. Likewise, a porous membrane in the form of a hollow fiber which is coated with the ultrathin nonporous layer may be referred to as a coated fiber.

The source of the feed gas mixture may contain a gas stream and volatile organic compounds which may include, for example, air stripping product streams, centrifugal purge/inerting systems, degreasing of metal parts, dry cleaning stores, printing and painting facilities, propellant manufacturing operations, soil decontamination facilities, ventilation systems and gasoline transfer terminals. The gas stream may be, for example, air, $N_2$, $O_2$, $CO_2$, methane, argon, hydrogen and helium. Those skilled in the art will recognize the above list of examples is not exhaustive. The feed gas may be a multicomponent gas/vapor mixture which may be a mixture of gases and vapors, or only vapors.

Notation

P feed side total pressure (psig)
$P_i$ feed side partial pressure of species i (psig)
p permeate side total pressure (psig)
$p_i$ permeate side partial pressure of species i (psig)
$t_{ads}$ adsorption/absorption time (s)
$t_{reg}$ stripping/regeneration time (s)
$T_{cycle}$ total cycle time (s)

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

Various references are cited herein, the disclosures of which are incorporated herein by reference in their entirety.

What is claimed is:

1. A method for selectively removing at least one target component from a multicomponent feed fluid using a removal system, said system including a feed chamber having an inlet and an outlet, a permeate chamber, and a membrane means for separating said feed and permeate chambers, wherein said membrane is selective for the at least one target component, said method comprising:

in a first period, introducing the feed fluid into said feed chamber through said inlet, thereby exposing the feed fluid to said membrane, while allowing flow out of said outlet, wherein at least a portion of the at least one target component in said feed chamber is removed by said membrane;

in a second period, simultaneously halting flow through said inlet and said outlet of said feed chamber, thereby trapping the feed fluid within said feed chamber; and providing a component-gradient across said membrane in both said first and second periods, thereby continually removing the at least one target component and regenerating said membrane.

2. The method according to claim 1 wherein said component-gradient is provided by maintaining a lower total pressure in the permeate chamber than the total pressure in the feed chamber.

3. The method according to claim 1 wherein said component-gradient is provided by maintaining at least a partial vacuum in the permeate chamber.

4. The method according to claim 1 wherein said component-gradient is provided by passing a sweep fluid through said permeate chamber past said membrane.

5. The method according to claim 1 further comprising terminating the first period before a maximum threshold of the at least one target component reaches said outlet.

6. The method according to claim 1 further comprising terminating the first period after a predetermined time period.

7. The method according to claim 1 wherein said membrane means comprises at least one feed membrane having a feed side for contacting the feed fluid and an intermediate membrane side, and at least one permeate membrane having an intermediate membrane side and a permeate side, wherein an intermediate fluid is maintained between said intermediate membrane sides of said feed and permeate membranes, wherein said feed membrane, the intermediate fluid, and said permeate membrane are each selective for the at least one target component.

8. The method according to claim 7 wherein said intermediate fluid is a liquid.

9. The method according to claim 7 wherein said intermediate fluid is comprised of a nonvolatile liquid absorbent.

10. The method according to claim 1 further comprising collecting the at least one target component from said permeate chamber.

11. An apparatus for selectively removing at least one target component from a multicomponent feed fluid, said apparatus comprising:

a housing provided with a feed chamber;

feed inlet means for allowing the feed fluid to flow into said feed chamber;

feed outlet means for allowing the feed fluid to flow out of said feed chamber;

membrane means disposed in said housing for selectively allowing the permeation of the at least one target component therethrough, and having a feed side for contacting the feed fluid and a permeate side for delivering the at least one target component, wherein said feed side defines at least part of said feed chamber;

permeate means for drawing the at least one target component from said permeate side of said membrane means, thereby providing a component-gradient across said membrane means; and control means for controlling the flow of the feed fluid through said feed inlet means and said feed outlet means, wherein the feed fluid, at a desired feed fluid pressure, is cyclically introduced into said feed chamber into contact with said membrane means;

whereby the at least one target component is removed from the feed fluid, and the feed fluid exiting through said feed outlet means is at least partially purified of the at least one target component.

12. The apparatus according to claim 11 wherein said permeate means continuously removes the at least one target component from said permeate side, whereby said membrane means is continuously regenerated.

13. The apparatus according to claim 11 wherein at least one cycle of contact between the feed fluid and said membrane means comprises:

an adsorption period wherein said multicomponent feed fluid, as an unpurified feed fluid, passes through said feed inlet means, into said feed chamber, and into contact with said membrane means, wherein the at least one target component is adsorbed onto said feed side of said membrane means, and wherein said permeate means draws the at least one target component off said permeate side of said membrane means; and a regeneration period wherein flow of the feed fluid into said feed inlet means and out of said feed outlet means is stopped, and wherein said permeate means draws the at least one target component off said permeate side of said membrane means, thereby regenerating said membrane means, thereby further purifying the feed fluid which is retained in said feed chamber.

14. The apparatus according to claim 13 wherein said adsorption period is terminated before a predetermined concentration of the at least one target component reaches said feed outlet means.

15. The apparatus according to claim 13 wherein said adsorption period is terminated after a predetermined period of time.

16. The apparatus according to claim 13 wherein said regeneration period is terminated after a predetermined period of time.

17. The apparatus according to claim 11 wherein at least one cycle of contact between the feed fluid and said membrane means comprises:

a first period of time wherein said multicomponent feed fluid, as an unpurified feed fluid, is introduced into said feed chamber and brought into contact with said membrane means; and a second period of time wherein the feed fluid is retained in said feed chamber and kept in contact with said membrane means while flow of the feed fluid into said feed inlet means and out of said feed inlet means is substantially halted, whereby purification of the feed fluid into a purified feed fluid is maximized.

18. The apparatus according to claim 17 wherein said control means regulates respective durations of said first and second periods.

19. The apparatus according to claim 17 wherein said first period follows said second period and, in said first period, the flow of unpurified feed fluid into said feed chamber induces said purified feed fluid disposed in said feed chamber to exit through said feed outlet means.

20. The apparatus according to claim 17 wherein said cycle further comprises a third period wherein flow of the feed fluid into said feed inlet means remains halted and flow of the feed fluid out of said feed outlet means is induced.

21. The apparatus according to claim 11 wherein said permeate means further comprises means for maintaining the partial pressure of the at least one target component on said permeate side of said membrane means lower than the partial pressure on said feed side of said membrane means.

22. The apparatus according to claim 11 wherein said permeate means further comprises means for maintaining the total pressure on said permeate side of said membrane means substantially lower than the total pressure on said feed side of said membrane means.

23. The apparatus according to claim 11 wherein said permeate means further comprises means for sweeping said permeate side of said membrane means with a sweep fluid.

24. The apparatus according to claim 11 wherein said permeate means further comprises means for maintaining at least a partial vacuum on said permeate side of said membrane means.

25. The apparatus according to claim 11 wherein said multicomponent feed fluid comprises at least one non-target component, wherein the at least one target component passes through said membrane more rapidly than the at least one non-target component.

26. The apparatus according to claim 11 wherein said membrane means comprises a porous membrane with a nonporous selective coating.

27. The apparatus according to claim 26 wherein said membrane is polymeric.

28. The apparatus according to claim 26 wherein said membrane is nonpolymeric.

29. The apparatus according to claim 26 wherein said membrane means comprises a plurality of porous membranes adapted to contact the feed fluid in parallel.

30. The apparatus according to claim 26 wherein said porous membrane further comprises at least one polymeric hollow fiber.

31. The apparatus according to claim 30 wherein the feed fluid passes through the lumen of said hollow fiber.

32. The apparatus according to claim 30 wherein the feed fluid passes over the exterior of said hollow fiber.

33. The apparatus according to claim 26 wherein said porous membrane further comprises a thin film composite (TFC) membrane having a selective nonporous polymeric membrane coating over a microporous substrate.

34. The apparatus according to claim 26 wherein said porous membrane further comprises a liquid membrane immobilized in the pores of said porous substrate.

35. The apparatus according to claim 26 wherein said membrane means comprises at least one hollow fiber module having a plurality of hollow fibers disposed within a hollow shell housing.

36. The apparatus according to claim 35 wherein the feed fluid flows through the lumina of said fibers.

37. The apparatus according to claim 36 wherein said permeate means draws a vacuum on the shell side of said fibers.

38. The apparatus according to claim 36 wherein said plurality of hollow fibers further comprises first and second sets of hollow fibers disposed within said hollow shell housing and a liquid membrane is disposed between said first and second sets of hollow fibers in the shell side of said housing;

wherein the feed fluid flows through the lumina of said first set of hollow fibers; and wherein said permeate means draws a vacuum on the lumina of said second set of hollow fibers.

39. The apparatus according to claim 26 wherein said membrane means comprises a hollow fiber module having a plurality of microporous polypropylene hollow fibers, wherein the exterior of each fiber is covered with a thin plasma polymerized nonporous silicone coating.

40. The apparatus according to claim 26 wherein said membrane means further comprises:

at least one feed membrane having a feed side for contacting the feed fluid and an intermediate membrane side, said at least one feed membrane being selective for the at least one target component; and at least one permeate membrane having an intermediate membrane side and a permeate side which is exposed to said permeate means, said at least one permeate membrane being selective for the at least one target component;

an intermediate fluid disposed between said intermediate membrane sides of said feed and permeate membranes, said intermediate fluid being selective for the at least one target component;

whereby the at least one target component is capable of passing from the feed fluid, through said feed membrane, through the intermediate fluid, and through said permeate membrane.

41. The apparatus according to claim 40 wherein said intermediate fluid is a liquid.

42. The apparatus according to claim 40 wherein said intermediate fluid is a nonvolatile liquid absorbent.

43. The apparatus according to claim 11 wherein said membrane means comprises a ceramic membrane with a ceramic nonporous skin.

44. The apparatus according to claim 11 further comprising a means for metering the flow of the feed fluid.

45. The apparatus according to claim 11 further comprising a surge collection means for collecting the at least one target component drawn by said permeate means.

46. The apparatus according to claim 11 further comprising a surge collection means for collecting treated feed fluid which exits from said feed chamber.

47. An apparatus for selectively removing at least one target component from a multicomponent feed fluid, said apparatus comprising:

a housing having a feed chamber;

a feed inlet connected to said feed chamber to receive said feed fluid;

a feed outlet connected to said feed chamber to send out said feed fluid;

a membrane disposed in said housing to allow the permeation of the at least one target component therethrough, and having a feed side for contacting the feed fluid and a permeate side for delivering the at least one target component, wherein said feed side defines at least part of said feed chamber;

a permeate located along said permeate side of said membrane to draw the at least one target component, thereby providing a component-gradient across said membrane; and a controller operative to control the flow of the feed fluid through said feed inlet and said feed outlet, wherein the feed fluid, at a desired feed fluid pressure, is cyclically introduced into said feed chamber into contact with said membrane;

whereby the at least one target component is removed from the feed fluid, and the feed fluid exiting through said feed outlet is at least partially purified of the at least one target component.

* * * * *

UNITED STATES PATENT AND TRADEMARK OFFICE
CERTIFICATE OF CORRECTION

PATENT NO. : 5,928,409
DATED : July 27, 1999
INVENTOR(S) : Kamalesh K. Sirkar

It is certified that error appears in the above-identified patent and that said Letters Patent is hereby corrected as shown below:

<u>Title page,</u>
The title page should be deleted and substitute therefore the attached title page.

<u>Drawings,</u>
Delete Drawings Sheets 1-11, and substitute therefore the Drawing Sheets, consisting of FIGS 1-11, as shown on the attached pages.

Signed and Sealed this

Fifth Day of February, 2002

JAMES E. ROGAN
Director of the United States Patent and Trademark Office

Attest:

Attesting Officer

United States Patent [19]

Sirkar

[11] Patent Number: 5,928,409
[45] Date of Patent: Jul. 27, 1999

[54] METHOD AND APPARATUS FOR GAS REMOVAL BY CYCLIC FLOW SWING MEMBRANE PERMEATION

[75] Inventor: Kamalesh K. Sirkar, Berkeley Heights, N.J.

[73] Assignee: New Jersey Institute of Technology, Newark, N.J.

[21] Appl. No.: 08/968,705

[22] Filed: Nov. 12, 1997

[51] Int. Cl.[6] .................................................. B01D 53/22
[52] U.S. Cl. ........................... 95/45; 95/50; 96/4; 96/8; 96/13
[58] Field of Search ...................... 95/44, 45, 47–55; 96/4, 5, 7–14

[56] References Cited

U.S. PATENT DOCUMENTS

| | | | |
|---|---|---|---|
| 4,553,983 | 11/1985 | Baker | 95/50 |
| 4,718,921 | 1/1988 | Makino et al. | 95/52 |
| 4,750,918 | 6/1988 | Sirkar | 95/44 |
| 4,770,675 | 9/1988 | Kurzweg et al. | 96/4 X |
| 4,900,448 | 2/1990 | Boone et al. | 95/44 |
| 4,955,998 | 9/1990 | Ueda et al. | 55/16 |
| 5,030,251 | 7/1991 | Rice et al. | 55/16 |
| 5,084,073 | 1/1992 | Prasad | 95/52 |
| 5,104,425 | 4/1992 | Rao et al. | 95/50 X |
| 5,108,464 | 4/1992 | Friesen et al. | 95/52 |
| 5,125,937 | 6/1992 | Sadkowski et al. | 96/8 |
| 5,131,929 | 7/1992 | Brockman et al. | 55/16 |
| 5,190,667 | 3/1993 | Jaeger | 95/45 X |
| 5,226,932 | 7/1993 | Prasad | 95/45 |
| 5,240,612 | 8/1993 | Grangeon et al. | 210/636 |
| 5,259,869 | 11/1993 | Auvil et al. | 95/52 |
| 5,281,254 | 1/1994 | Birbara et al. | 95/44 |
| 5,284,506 | 2/1994 | Barbe | 95/23 |
| 5,332,424 | 7/1994 | Rao et al. | 95/50 X |
| 5,354,474 | 10/1994 | LaPack et al. | 210/637 |
| 5,383,956 | 1/1995 | Prasad et al. | 95/45 |
| 5,487,774 | 1/1996 | Peterson et al. | 95/45 |
| 5,498,339 | 3/1996 | Creusen et al. | 95/50 X |
| 5,580,452 | 12/1996 | Lin | 96/5 X |
| 5,749,941 | 5/1998 | Jansen et al. | 95/49 X |
| 5,753,009 | 5/1998 | Sirkar et al. | 95/45 |

FOREIGN PATENT DOCUMENTS

| | | |
|---|---|---|
| 305120 | 3/1989 | European Pat. Off. |
| 438722 | 7/1991 | European Pat. Off. |

OTHER PUBLICATIONS

Beaver et al (1988) AIChE Symp Ser 84:113–23.
Bhaumik et al (1996) AIChEJ 42:409.
Gilleskie et al (1995) AIChEJ 41:1413.
Papadopoulos et al (1994) J Membrane Sci 94:163.
Paul et al (1971) Proc Des Dev 10:375.
Poddar et al (1996) AIChEJ 42:3267.
Poddar et al (1996) J Membrane Sci 120:221.
Yang (1987) In: Gas Separation by Adsorption Processes, Butterworths, boston, p. 1.

*Primary Examiner*—Robert Spitzer
*Attorney, Agent, or Firm*—Klauber & Jackson

[57] ABSTRACT

In one aspect, a method for selectively removing at least one target component from a multicomponent feed fluid using a removal system, the system including a feed chamber having an inlet and an outlet, a permeate chamber, and a membrane for separating the feed and permeate chambers. The membrane is selective for the at least one target component. The method includes: in a first period, introducing the feed fluid into the feed chamber through the inlet, thereby exposing the feed fluid to the membrane, while allowing flow out of the outlet, wherein at least a portion of the at least one target component in the feed chamber is removed, either by absorption or adsorption, by the membrane; in a second period, simultaneously halting flow through the inlet and the outlet of the feed chamber, thereby trapping the feed fluid within the feed chamber; and providing a component-gradient across the membrane in both the first and second periods, thereby continually removing the at least one target component and regenerating the membrane.

47 Claims, 5 Drawing Sheets

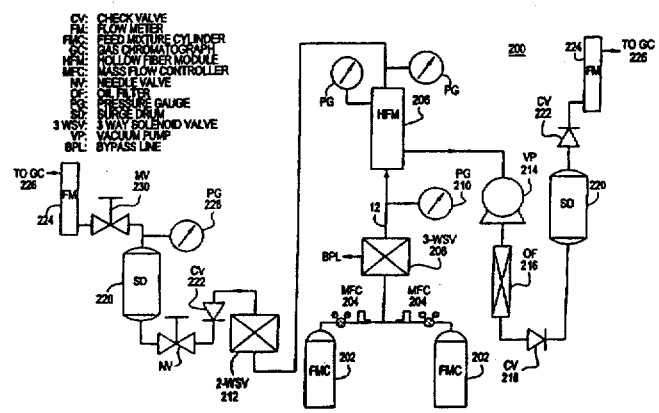

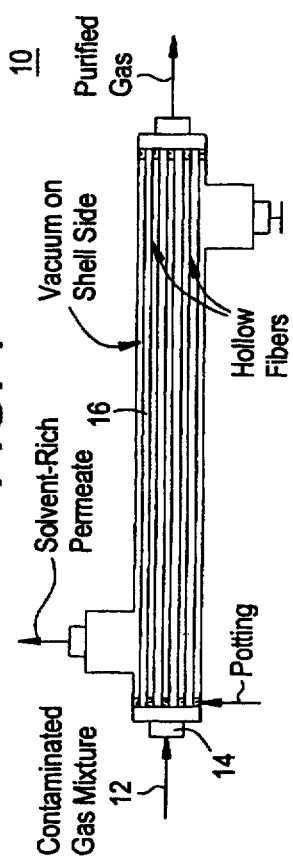
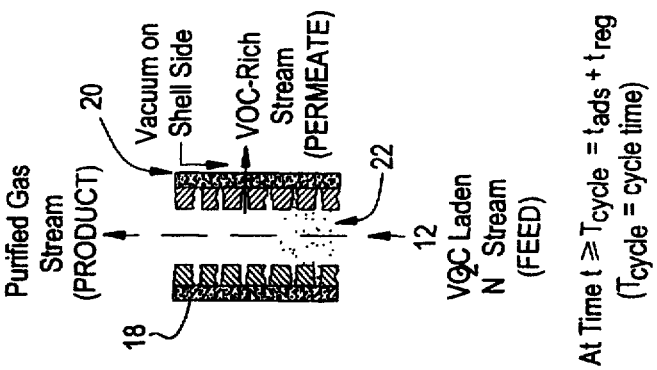
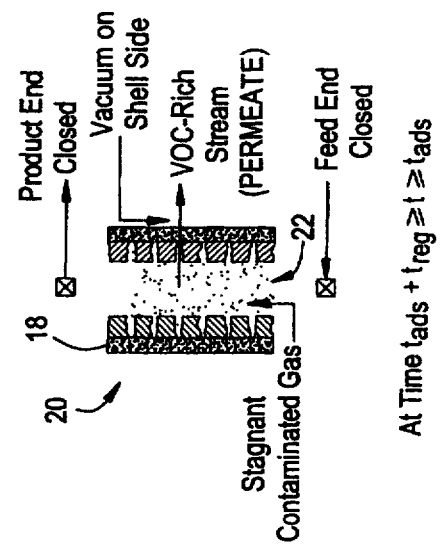
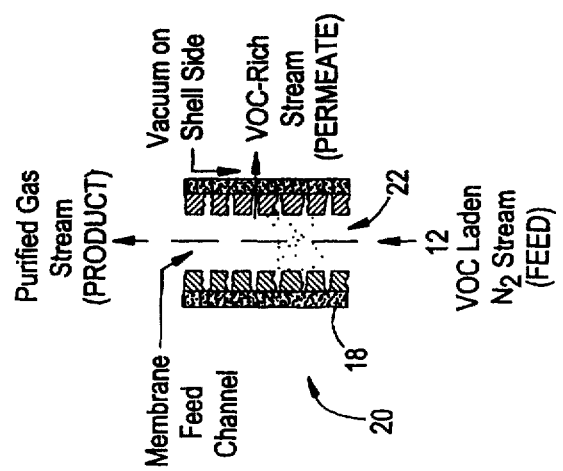

At Time $t_{ads} + t_{reg} \geq t \geq t_{ads}$

At Time $t \geq T_{cycle}$
($T_{cycle}$ = cycle time)